US012035340B2

(12) United States Patent
Matsumura et al.

(10) Patent No.: US 12,035,340 B2
(45) Date of Patent: Jul. 9, 2024

(54) USER TERMINAL

(71) Applicant: NTT DOCOMO, INC., Tokyo (JP)

(72) Inventors: Yuki Matsumura, Tokyo (JP); Kazuki Takeda, Tokyo (JP); Shohei Yoshioka, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 661 days.

(21) Appl. No.: 17/260,387

(22) PCT Filed: Jul. 27, 2018

(86) PCT No.: PCT/JP2018/028325
§ 371 (c)(1),
(2) Date: Jan. 14, 2021

(87) PCT Pub. No.: WO2020/021720
PCT Pub. Date: Jan. 30, 2020

(65) Prior Publication Data
US 2021/0298028 A1    Sep. 23, 2021

(51) Int. Cl.
*H04W 72/53* (2023.01)
*H04W 72/0446* (2023.01)
*H04W 72/23* (2023.01)

(52) U.S. Cl.
CPC ....... *H04W 72/53* (2023.01); *H04W 72/0446* (2013.01); *H04W 72/23* (2023.01)

(58) Field of Classification Search
CPC . H04W 72/53; H04W 72/0446; H04W 72/23; H04L 1/1896; H04L 5/001; H04L 5/0053; H04L 1/1854

USPC ......................................................... 370/329
See application file for complete search history.

(56) References Cited

U.S. PATENT DOCUMENTS

2018/0019843 A1 *   1/2018  Papasakellariou .... H04L 1/1854

FOREIGN PATENT DOCUMENTS

| AU | 2013319356 A1 * | 4/2015 | ........... H04L 1/1812 |
| CA | 2777399 A1 * | 4/2011 | ............... H04L 1/02 |
| CA | 2843494 A1 * | 2/2013 | ............... H04B 7/02 |
| CA | 2919899 A1 * | 10/2014 | ........... H04L 1/1671 |
| CA | 3046451 A1 * | 6/2018 | ............... H04L 1/00 |

(Continued)

OTHER PUBLICATIONS

3GPP TSG-RAN WG1#92bis RI-1804483, Apr. 6, 2018 (Section 2) (Year: 2018).*

(Continued)

*Primary Examiner* — Tejis Daya
*Assistant Examiner* — Oladiran Gideon Olaleye
(74) *Attorney, Agent, or Firm* — Osha Bergman Watanabe & Burton LLP

(57) ABSTRACT

A user terminal according to the present invention includes: a receiving section that receives a plurality of pieces of downlink control information (DCI) each of which includes a certain field value indicating a same slot for an uplink control channel used for transmission of transmission confirmation information to a plurality of downlink shared channels; and a control section that controls derivation of an index of a control channel element (CCE) used for determination of a resource for the uplink control channel. With this, it is possible to appropriately determine a resource for the uplink control channel.

3 Claims, 11 Drawing Sheets

| PUCCH RESOURCE IDENTIFIER | PUCCH RESOURCE |
|---|---|
| '000' | FIRST PUCCH RESOURCE WITH PUCCH RESOURCE ID OBTAINED FROM FIRST VALUE OF RESOURCE LIST |
| '001' | SECOND PUCCH RESOURCE WITH PUCCH RESOURCE ID OBTAINED FROM SECOND VALUE OF RESOURCE LIST |
| '010' | THIRD PUCCH RESOURCE WITH PUCCH RESOURCE ID OBTAINED FROM THIRD VALUE OF RESOURCE LIST |
| '011' | FOURTH PUCCH RESOURCE WITH PUCCH RESOURCE ID OBTAINED FROM FOURTH VALUE OF RESOURCE LIST |
| '100' | FIFTH PUCCH RESOURCE WITH PUCCH RESOURCE ID OBTAINED FROM FIFTH VALUE OF RESOURCE LIST |
| '101' | SIXTH PUCCH RESOURCE WITH PUCCH RESOURCE ID OBTAINED FROM SIXTH VALUE OF RESOURCE LIST |
| '110' | SEVENTH PUCCH RESOURCE WITH PUCCH RESOURCE ID OBTAINED FROM SEVENTH VALUE OF RESOURCE LIST |
| '111' | EIGHTH PUCCH RESOURCE WITH PUCCH RESOURCE ID OBTAINED FROM EIGHTH VALUE OF RESOURCE LIST |

(56) References Cited

FOREIGN PATENT DOCUMENTS

| WO | WO-2008156034 A1 | * | 12/2008 | ........... | H04L 1/1854 |
| WO | WO-2018097218 A1 | * | 5/2018 | ......... | H04L 27/2607 |
| WO | WO-2018127628 A1 | * | 7/2018 | ........... | H04L 1/1854 |

OTHER PUBLICATIONS

3GPP TSG-RAN WG1#93 RI-1807067, May 12, 2018 (Section 4) (Year: 2018).*
3GPP TS 36.300 V8.12.0 "3rd Generation Partnership Project; Technical Specification Group Radio Access Network; Evolved Universal Terrestrial Radio Access (E-UTRA) and Evolved Universal Terrestrial Radio Access Network (EUTRAN); Overall description; Stage 2 (Release 8)" Mar. 2010 (149 pages).
3GPP TSG RAN WG1 Meeting #92bis; R1-1804483 "Discussion on remaining issues on PUCCH resource allocation" Panasonic; Sanya, China; Apr. 16-20, 2018 (8 pages).
3GPP TSG RAN WG1 Meeting #93; R1-1807067 "On HARQ-ACK feedback" NTT Docomo, Inc.; Busan, Korea; May 21-25, 2018 (11 pages).
3GPP TSG RAN WG1 Meeting #92bis; R1-1804015 "Remaining issues on resource allocation for PUCCH" OPPO; Sanya, China; Apr. 16-20, 2018 (4 pages).
3GPP TSG RAN WG1 Meeting #92bis; R1-1805742 "Summary of offline discussion on PUCCH resource allocation" OPPO; Sanya, China; Apr. 16-20, 2018 (10 pages).
International Search Report issued in International Application No. PCT/JP2018/028325, dated Oct. 23, 2018 (5 pages).
Written Opinion issued in International Application No. PCT/JP2018/028325; dated Oct. 23, 2018 (5 pages).
Extended European Search Report issued in European Application No. 18927916.9 dated Feb. 25, 2022 (9 pages).
InterDigital, Inc., "CBG-based (re)-transmission", 3GPP TSG RAN WG1 Meeting 90bis, R1-1718363 (R1-1716257), Prague, CZ, Oct. 9-13, 2017 (5 pages).
NTT Docomo, Inc., "Remaining issues CA and type1 HARQ-ACK codebook", 3GPP TSG RAN WG1 Meeting #93, R1-1807415, Busan, Korea, May 21-25, 2018 (11 pages).
Office Action issued in the counterpart Japanese Patent Application No. 2020-532125, dated May 24, 2022 (5 pages).
Office Action issued in counterpart Chinese Patent Application No. 201880098083.9 dated Jul. 27, 2023 (13 pages).
Office Action issued in European Application No. 18927916.9, dated May 30, 2023 (7 pages).

* cited by examiner

| PUCCH RESOURCE IDENTIFIER | PUCCH RESOURCE |
|---|---|
| '000' | FIRST PUCCH RESOURCE WITH PUCCH RESOURCE ID OBTAINED FROM FIRST VALUE OF RESOURCE LIST |
| '001' | SECOND PUCCH RESOURCE WITH PUCCH RESOURCE ID OBTAINED FROM SECOND VALUE OF RESOURCE LIST |
| '010' | THIRD PUCCH RESOURCE WITH PUCCH RESOURCE ID OBTAINED FROM THIRD VALUE OF RESOURCE LIST |
| '011' | FOURTH PUCCH RESOURCE WITH PUCCH RESOURCE ID OBTAINED FROM FOURTH VALUE OF RESOURCE LIST |
| '100' | FIFTH PUCCH RESOURCE WITH PUCCH RESOURCE ID OBTAINED FROM FIFTH VALUE OF RESOURCE LIST |
| '101' | SIXTH PUCCH RESOURCE WITH PUCCH RESOURCE ID OBTAINED FROM SIXTH VALUE OF RESOURCE LIST |
| '110' | SEVENTH PUCCH RESOURCE WITH PUCCH RESOURCE ID OBTAINED FROM SEVENTH VALUE OF RESOURCE LIST |
| '111' | EIGHTH PUCCH RESOURCE WITH PUCCH RESOURCE ID OBTAINED FROM EIGHTH VALUE OF RESOURCE LIST |

FIG. 1

USER TERMINAL

TECHNICAL FIELD

The present invention relates to a user terminal in next-generation mobile communication systems.

BACKGROUND ART

In UMTS (Universal Mobile Telecommunications System) networks, the specifications of Long Term Evolution (LTE) have been drafted for the purpose of further increasing high speed data rates, providing lower latency and so on (see Non-Patent Literature 1). For the purpose of further high capacity, advancement of LTE (LTE Rel. 8, Rel. 9), and so on, the specifications of LTE-A (LTE-Advanced, LTE Rel. 10, Rel. 11, Rel. 12, Rel. 13) have been drafted.

Successor systems of LTE (referred to as, for example, "FRA (Future Radio Access)," "5G (5th generation mobile communication system)," "5G+(plus)," "NR (New Radio)," "NX (New radio access)," "FX (Future generation radio access)," "LTE Rel. 14," "LTE Rel. 15" (or later versions), and so on) are also under study.

In the existing LTE systems (for example, also referred to as LTE Rel. 8 to Rel. 13, or simply LTE hereinafter), the user terminal receives a downlink shared channel (for example, PDSCH (Physical Downlink Shared Channel)) scheduled by downlink control information (DCI). The user terminal transmits uplink control information (UCI) including transmission confirmation information (HARQ-ACK (Hybrid Automatic Repeat reQuest-ACKnowledge), ACK/NACK (ACKnowledge/Non-ACK)) to the downlink shared channel, by using an uplink control channel (for example, PUCCH (Physical Uplink Control Channel)) or an uplink shared channel (for example, PUSCH (Physical Uplink Shared Channel)).

CITATION LIST

Non-Patent Literature

Non-Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)," April, 2010

SUMMARY OF INVENTION

Technical Problem

For the future radio communication systems (hereinafter, simply referred to as NR), it has been studied that the user terminal determines a resource (for example, PUCCH resource) for the uplink control channel to use for the transmission of the UCI including the transmission confirmation information (for example, HARQ-ACK, ACK/NACK) of the downlink shared channel (for example, PDSCH), based on the value of the certain field (also referred to as PUCCH resource identifier (PRI (PUCCH resource indicator/indication)) field, and the like) in DCI for scheduling the downlink shared channel. For NR, for example, it has been also studied to determine the resource for the uplink control channel, based on other parameters such as the index of the control channel element (CCE) in which DCI is allocated, and the like.

However, in a case that a plurality of pieces of DCI indicating feedback of HARQ-ACK using the same PUCCH are detected in at least one of the time domain and the frequency domain (for example, at least one of a plurality of slots and a plurality of cells), it is impossible to appropriately determine the resource for the uplink control channel, and, as a result, the error rate of the uplink control channel may increase.

The present invention has been made in view of such points, and an object of the present invention is to provide a user terminal that can appropriately determine a resource for an uplink control channel.

Solution to Problem

An aspect of a user terminal according to the present invention includes: a receiving section that receives a plurality of pieces of downlink control information (DCI) each of which includes a certain field value indicating a same slot for an uplink control channel used for transmission of transmission confirmation information to a plurality of downlink shared channels; and a control section that controls derivation of an index of a control channel element (CCE) used for determination of a resource for the uplink control channel.

Advantageous Effects of Invention

According to the present invention, it is possible to appropriately determine a resource for the uplink control channel.

BRIEF DESCRIPTION OF DRAWINGS

FIG. 1 is a diagram to show an example of an association between PRIs and PUCCH resources configured by higher layer signaling;

DESCRIPTION OF EMBODIMENTS (PUCCH Format)

Figure 2A:
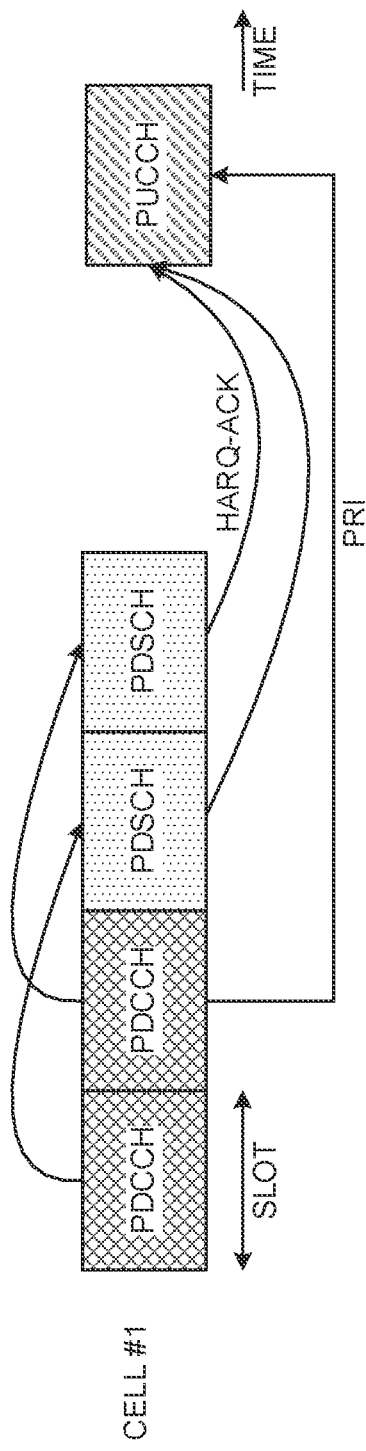
FIGS. 2A and 2B are diagrams to show examples of determination of a PUCCH resource.

For NR, configurations (also referred to as format, PUCCH format (PF), and the like) for an uplink control channel (for example, PUCCH) used for transmission of uplink control information (UCI) have been studied.

Here, the UCI may include at least one of the transmission confirmation information (HARQ-ACK (Hybrid Automatic Repeat reQuest-ACKnowledge), ACK/NACK (ACKnowledge/Non-ACK)) to the downlink shared channel (for example, PDSCH (Physical Downlink Shared Channel)), scheduling request (SR), and channel state information (CSI).

For example, in NR, the following PUCCH formats have been studied:

PUCCH format (also referred to as PF0, short PUCCH, and the like) that is used for the transmission of UCI (for example, at least one of HARQ-ACK and SR) of one or two bits, and is transmitted in one or two symbols;

PUCCH format (also referred to as PF1, long PUCCH, and the like) that is used for the transmission of UCI (for example, at least one of HARQ-ACK and SR) of one or two bits, and is transmitted in four or more symbols;

PUCCH format (also referred to as PF2, short PUCCH, and the like) that is used for the transmission of UCI more than two bits, and is transmitted in one or two symbols;

PUCCH format (also referred to as PF3, long PUCCH, and the like) that is used for the transmission of UCI more than two bits, and is transmitted in four or more symbols; and PUCCH format (also referred to as PF4, long PUCCH, and the like) that is used for the transmission of UCI more than two bits, and is transmitted in four or more symbols, and in which the PUCCH resource includes orthogonal cover code (OCC).

The PUCCH of these PUCCH formats described above may be transmitted in a particular cell in a group (also referred to as cell group (CG), PUCCH group, and the like) including one or more cells. For example, the particular cell may be a primary cell (PCell), a primary secondary cell (PSCell), a secondary cell (SCell, PUCCH-SCell) for the PUCCH transmission, and the like. Note that a "cell" may be also expressed in other words as a serving cell, a component carrier (CC), a carrier, and the like.

(PUCCH Resource)

In NR, a set of one or more resources for the PUCCH (PUCCH resources) may be configured by higher layer signaling. Note that the configuration by higher layer signaling may be reporting configuration information to a user terminal (also referred to as a UE (User Equipment), a terminal, a MS (Mobile station), and the like) from a base station (also referred to as a BS (Base Station), a transmission/reception point (TRP), eNB (eNodeB), gNB (NR NodeB), and the like).

For example, the higher layer signaling may be at least one of the following:

RRC (Radio Resource Control) signaling;

MAC (Medium Access Control) signaling (for example, MAC control element (MAC CE (Control Element)), MAC PDU (Protocol Data Unit));

information (for example, master information block (MIB)) transmitted by a broadcast channel (for example, PBCH (Physical Broadcast Channel)); and system information (for example, system information block (SIB), minimum system information (RMSI (Remaining Minimum System Information)), other system information (OSI)).

For example, the set (PUCCH resource set) including one or more PUCCH resources may be configured by higher layer signaling for each partial band (bandwidth part (BWP)) configured in the CC.

The user terminal may be configured with (a higher layer parameter (for example PUCCH-ResourceSet) indicating) one or more PUCCH resource sets. The user terminal may determine one of the configured PUCCH resource sets based on the number of bits (payload) of the UCI.

For example, in a case that the number of bits of UCI ($N_{UCI}$)≤2, the first PUCCH resource set (the first set of the PUCCH resources of the PUCCH resource set ID=0) may be determined. In a case that $2<N_{UCI}\le N_2$, the second PUCCH resource set (the second set of the PUCCH resource of the PUCCH resource set ID=1) may be determined. In a case that $N_2<N_{UCI}\le N_3$, the third PUCCH resource set (the third set of the PUCCH resource of the PUCCH resource set ID=2) may be determined. In a case that $N_3<N_{UCI}\le 1706$, the fourth PUCCH resource set (the fourth set of the PUCCH resources of the PUCCH resource set ID=3) may be determined. Here, each of $N_2$ and $N_3$ is a certain threshold value, and may be configured by higher layer signaling.

The user terminal may determine the PUCCH resource to use for the transmission of the UCI, based on the value of a certain field (also referred to as a PUCCH resource identifier (PRI (PUCCH resource indicator/indication)) field, ACK/NACK resource identifier (ARI (ACK/NACK Resource Indicator)) field, ACK/NACK resource offset (ARO (ACK/NACK Resource Offset)) field, and the like) in the DCI, from the PUCCH resource set determined based on the number of bits of the UCI. The value of the certain field is also referred to as PRI, ARI, ARO, and the like.

For example, each PUCCH resource in the PUCCH resource set may be associated with each value (also referred to as PRI and the like) of the PRI field in the DCI. The DCI may be DCI (DL assignment, DCI format 1_0 or 1_1) used for the scheduling of the PDSCH.

The PRI field in the DCI may be x bits (for example, x=3). In a case that the PUCCH resource set includes 2 to the x-th power of PUCCH resources or less (for example, 8 if x=3), the user terminal may determine the PUCCH resource associated with the value of the PRI field for the transmission of the UCI.

FIG. 1 is a diagram to show an example of an association between PRIs and PUCCH resources configured by higher layer signaling. As shown in FIG. 1, in a case that the PRI field in the DCI is three bits, eight kinds of values may be mapped to respective first to eighth PUCCH resources, which are identified by identifiers (PUCCH resource IDs) obtained by first to eighth values of a list (ResourceList) of up to eight PUCCH resources in the PUCCH resource set.

On the other hand, in a case that the PUCCH resource set includes more than 2 to the x-th power of PUCCH resources (for example, 8 if x=3), the user terminal may determine the PUCCH resource for the transmission of the UCI, based on other parameters, in addition to the value the PRI field (also referred to as $\Delta_{PRI}$, PRI, ARI, ARO, and the like). Other parameters may include at least one of the following:

the number ($N_{CCE,\,p}$) of control channel elements (CCEs) in the control resource set (CORESET) p for the reception of the downlink control channel (for example, PDCCH (Physical Downlink Control Channel)) transmitting the DCI including the PRI field; and the index ($n_{CCE,\,p}$, CCE index) of the CCE (for example, the first CCE) for the reception of the downlink control channel.

For example, in a case that the PRI field in the DCI is of three bits, if the number of PUCCH resources in the PUCCH resource set (also referred to as the size of the above list (ResourceList), $R_{PUCCH}$, and the like) is greater than 8, the user terminal may determine (the index $r_{PUCCH}$ of) the PUCCH resource used for the transmission of the UCI, based on Equation 1 described below.

[Math. 1]

$$r_{PUCCH} = \begin{cases} \left\lfloor \dfrac{n_{CCE,p} \cdot \lfloor R_{PUCCH}/8 \rfloor}{N_{CCE,p}} \right\rfloor + \Delta_{PRI} \cdot \left\lceil \dfrac{R_{PUCCH}}{8} \right\rceil & \text{if } \Delta_{PRI} < R_{PUCCH} \bmod 8 \\ \left\lfloor \dfrac{n_{CCE,p} \cdot \lfloor R_{PUCCH}/8 \rfloor}{N_{CCE,p}} \right\rfloor + \Delta_{PRI} \cdot \left\lfloor \dfrac{R_{PUCCH}}{8} \right\rfloor + R_{PUCCH} \bmod 8 & \text{if } \Delta_{PRI} \geq R_{PUCCH} \bmod 8 \end{cases}$$

Equation 1

Here, $N_{CCE,\,p}$ is the number of CCEs in the CORESET p corresponding to the PDCCH reception in the DCI (for example, DCI format 1_0 or 1_1). $n_{CCE,\,p}$ is the index of the first CCE for the PDCCH reception (the smallest index of the CCE in the PDCCH candidate in which the DCI is detected). $\Delta_{PRI}$ is a value of the PRI field in the DCI (for example, DCI format 1_0 or 1_1). $R_{PUCCH}$ is the number of PUCCH resources included in the PUCCH resource set.

Note that, for example, each PUCCH resource may include at least one of the number of symbols assigned to the PUCCH, the start index of the symbol, the resource block (also referred to as physical resource block (PRB) and the like) assigned to the PUCCH, the start index of the resource block, whether or not to apply frequency hopping in the slot, the start index of the PRB of the second hop in a case that frequency hopping is applied, and the like.

Each PUCCH resource may be associated with the above described PUCCH formats, and may include resource (for example, initial cyclic shift of PF0, OCC of the time domain of PF1, OCC length of PF4, OCC index, and the like) specific to the associated PUCCH formats.

In NR, in a case that a plurality of PDSCHs are scheduled by a plurality of respective pieces of DCI (for example, DCI format 1_0 or 1_1), it is also assumed that the user terminal feeds back UCI including HARQ-ACKs corresponding to the plurality of respective PDSCHs to the base station by using the same PUCCH in the same slot.

In this case, the certain field (also referred to as PDSCH-to-HARQ_feedback timing indicator field, HARQ feedback timing indication field, HARQ-ACK timing indication field, and the like) in each of the plurality of pieces of DCI may indicate the same slot for the PUCCH to use for the transmission of HARQ-ACK for the PDSCH scheduled by the plurality of pieces of DCI.

However, in a case that the plurality of pieces of DCI are detected in at least one of the time domain and the frequency domain (in a case that the plurality of pieces of DCI are detected in a plurality of resources which are different in at least one of the time domain and the frequency domain), the question is based on which DCI the user terminal determines the PUCCH resource to use for the transmission of the UCI described above.

Here, "different time domain resources" may be, for example, a plurality of different slots, a plurality of different symbols, and the like. "Different frequency domain resources" may be, for example, a plurality of different cells (also referred to as CCs, carriers, serving cells, and the like), or may be different partial bands (bandwidth parts (BWPs)) in a cell. The index of the cell is also referred to as a cell index, a CC index, a carrier index, and the like. The index of the BWP is also referred to as a BWP index and the like.

Figure 2B:
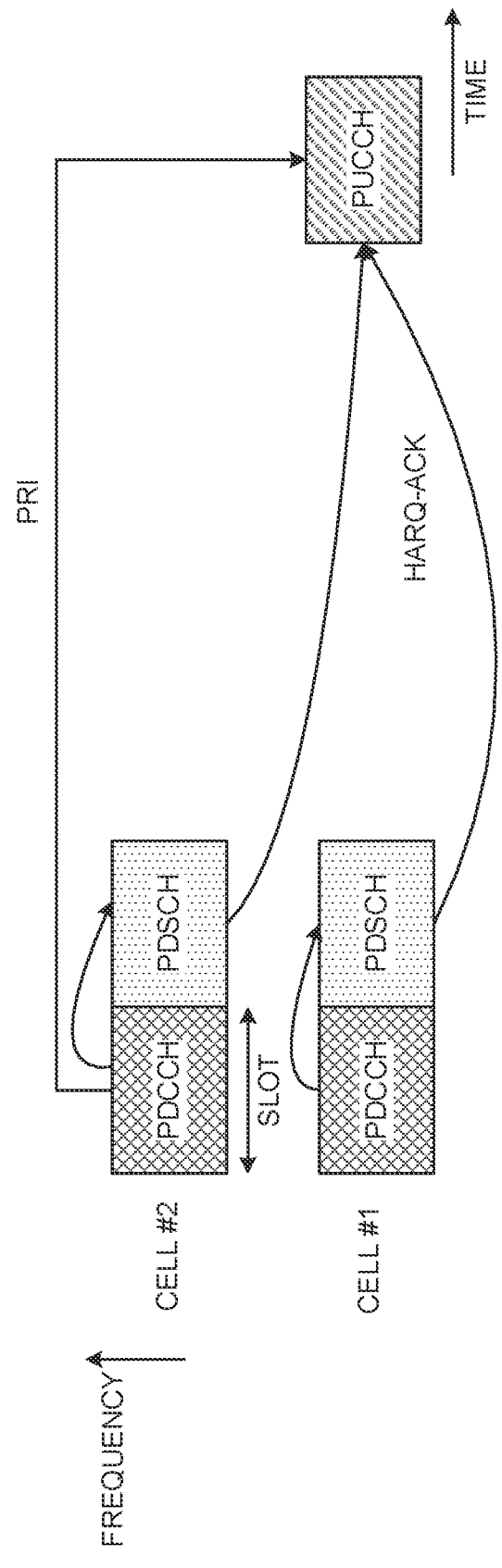

FIGS. 2A and 2B are diagrams to show examples of determination of a PUCCH resource. In FIGS. 2A and 2B, for example, the PRI field value in the DCI is three bits, and up to eight PUCCH resources are included in the PUCCH resource set (for example, the first PUCCH resource set) determined based on the payload of the UCI.

In FIGS. 2A and 2B, the HARQ-ACKs to the PDSCHs scheduled by the plurality of pieces of DCI are fed back in the same PUCCH. Note that, in FIGS. 2A and 2B, a PDCCH transmitting each DCI and a PDSCH scheduled by each DCI are allocated to different slots, but this is only an example and the configuration is not limited to this.

In FIGS. 2A and 2B, the PUCCH is allocated to one whole slot, but the configuration is not limited to this, and any PUCCH format such as those mentioned above may be used.

As shown in FIG. 2A, in a case that a plurality of pieces of DCI to which HARQ-ACKs are fed back by using the same PUCCH are detected in different time domain resources (for example, different slots), the user terminal may determine the PUCCH resource, based on the PRI in the last (most recent) DCI among the plurality of pieces of DCI (for example, see FIG. 1).

As shown in FIG. 2B, in a case that a plurality of pieces of DCI to which HARQ-ACKs are fed back by using the same PUCCH are detected in different frequency domain resources (for example, different cells), the user terminal may determine the PUCCH resource, based on the PRI in the DCI detected in cell #2 of the first cell index in the descending order among the different cell indexes (for example, see FIG. 1).

As shown in FIGS. 2A and 2B, in a case that a plurality of pieces of DCI to which HARQ-ACKs are fed back by using the same PUCCH are detected in at least either one of different time domain resources and the different frequency domain resources, the user terminal can appropriately derive the PRI to use for the determination of the PUCCH resource.

However, as mentioned above, for the determination of the PUCCH resource, a case is assumed in which parameters other than the PRI are used (for example, at least one of the CCE index and the number of CCEs in the CORESET) (for example, a case that the PUCCH resource set includes more than 2 to the x-th power of PUCCH resources (for example, 8 if x=3).

Therefore, in a case that a plurality of pieces of DCI to which HARQ-ACK is fed back by using the same PUCCH are detected in at least one of different time domain resources and the different frequency domain resources, the user terminal cannot appropriately derive parameters (for example, at least one of the CCE index and the number of CCEs in the CORESET) other than the PRI to use for the determination of the PUCCH resource, and as a result, it may be impossible to determine the PUCCH resource appropriately.

Thus, the inventors of the present invention have studied a method to appropriately derive parameters (for example, at least one of the CCE index and the number of CCEs in the CORESET) other than the PRI to use for the determination of the PUCCH resource, and resulted in the present invention.

The present embodiment will be described in detail as follows. In the following, in a case that the PRI field in the DCI is constituted of x bits, a case is assumed in which the number of PUCCH resources included in the PUCCH resource set (for example, the first PUCCH resource set) determined based on the payload is greater than 2 to the x-th power, but no such limitation is intended. The present embodiment is applicable to any cases in which a PUCCH resource is derived by using a parameter other than a PRI.

In the present embodiment, a case is exemplified in which HARQ-ACKs (HARQ-ACKs of two bits) of the PDSCHs scheduled by two pieces of DCI are fed back by using the same PUCCH, but no such limitation is intended. In a case of receiving two or more pieces of DCI, the present embodiment is applicable to a case that HARQ-ACKs of two or more bits are fed back by using the same PUCCH.

(First Aspect)

In the first aspect, the derivation of the CCE index used for the determination of the PUCCH resource will be described.

<Case that a Plurality of Pieces of DCI are Detected in Frequency Domain>

In a case that a plurality of pieces of DCI indicating the same HARQ-ACK timing (for example, the same slot) are detected in different frequency bands, the user terminal may determine the CCE index to use for the determination of the PUCCH resource, based on the indexes of the frequency bands.

Note that, in the following, a case is described in which the frequency bands are cells. However, the frequency bands may be serving cells, CCs, carriers, BWPs, and the like. A "cell index" in the following may be expressed in other words as a serving cell index, a CC index, a carrier index, a BWP index, and the like.

For example, in a case that a plurality of pieces of DCI indicating the same HARQ-ACK timing (for example, the same slot) are detected in a plurality of different cells, the CCE index used for the determination of the PUCCH resource may be derived by the DCI detected in the cell of the first cell index in the descending order or the ascending order in the plurality of cells. Here, the "CCE index derived by DCI" may be, for example, a CCE index of a certain CCE (the first CCE) in which the DCI is allocated.

<<First CCE Index Derivation>>

In the first CCE index derivation, in a case that a plurality of pieces of DCI indicating the same HARQ-ACK timing are detected in a plurality of cells, the user terminal may determine the PUCCH resource, based on the CCE index derived by the DCI detected in the cell of the first cell index (in other words, largest cell index) in the descending order.

Figure 3:
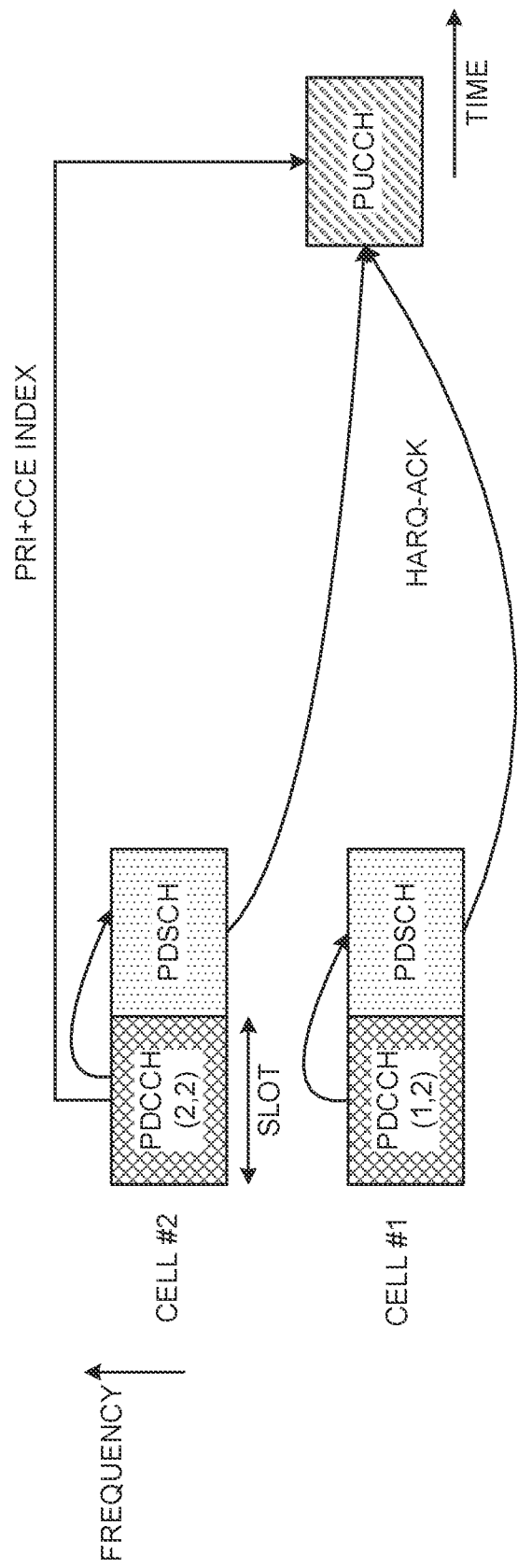
FIG. 3 is a diagram to show an example of determination of a PUCCH resource in a case that a plurality of pieces of DCI are detected in the frequency domain according to a first aspect.

FIG. 3 is a diagram to show an example of determination of a PUCCH resource in a case that a plurality of pieces of DCI are detected in the frequency domain according to the first aspect. For example, in FIG. 3, two pieces of DCI including a HARQ-ACK timing field value indicating the same slot for the PUCCH transmission are detected in cells #1 and #2 of the same slot.

In FIG. 3, the user terminal determines the PUCCH resource used for the transmission of HARQ-ACKs (for example, HARQ-ACKs of two bits) for the two PDSCHs scheduled by the two respective pieces of DCI.

Particularly, the user terminal may determine the PUCCH resource, based on the CCE index for the DCI detected in cell #2 of the first cell index in the descending order and the PRI in the DCI, in the two pieces of DCI detected in cells #1 and #2. For example, Equation 1 described above may be used for the determination of the PUCCH resource.

In FIG. 3, the PRI and the CCE index used for the determination of the PUCCH resource are derived based on the same DCI. Therefore, in FIG. 3, while considering the possibility of a detection failure of DCI, the base station can easily perform assignment of the CCE to the DCI and assignment of the PUCCH resource.

In FIG. 3, unless the user terminal fails (misses) to detect the DCI in the cell of the largest cell index, the user terminal can appropriately determine the PUCCH resource, based on the PRI and the CCE index derived based on the DCI. Therefore, in a case that the user terminal uses a false PUCCH resource, increase in the error rate of the PUCCH by contention with PUCCH resources that are assigned to other user terminals can be prevented.

<<Second CCE Index Derivation>>

In second CCE index derivation, in a case that a plurality of pieces of DCI indicating the same HARQ-ACK timing are detected in a plurality of cells, the user terminal may determine the PUCCH resource, based on the CCE index derived by the DCI detected in the cell of the first cell index (in other words, the smallest cell index) in the ascending order.

Figure 4:
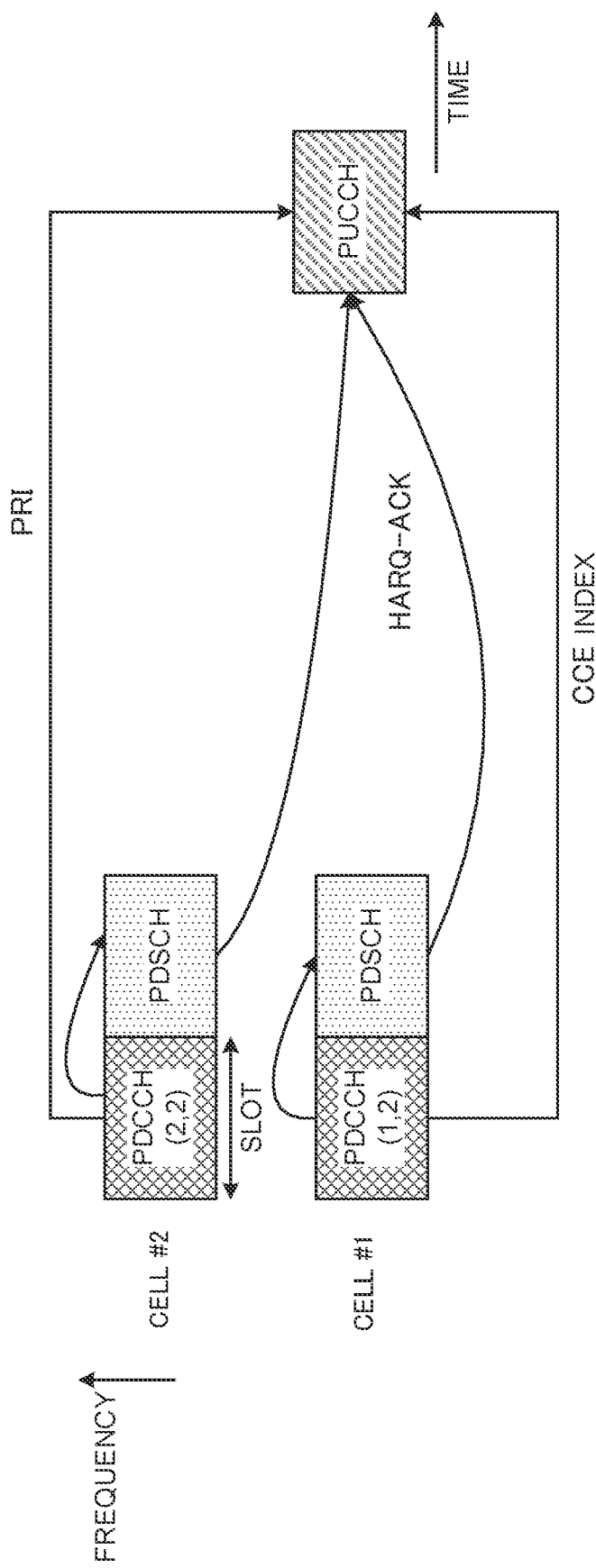
FIG. 4 is a diagram to show another example of determination of a PUCCH resource in a case that a plurality of pieces of DCI are detected in the frequency domain according to the first aspect.

FIG. 4 is a diagram to show another example of determination of a PUCCH resource in a case that a plurality of pieces of DCI are detected in the frequency domain according to the first aspect. FIG. 4 is different from FIG. 3 in that the PUCCH resource is determined based on the CCE index for the DCI detected in cell #1 of the first cell index in the ascending order, rather than cell #2 of the first cell index in the descending order. In the following, differences from FIG. 3 will be mainly described.

As shown in FIG. 4, the user terminal may determine the PUCCH resource, based on the CCE index for the DCI detected in cell #1 of the first index in the ascending order and the PRI in the DCI detected in cell #2 of the first index in the descending order, in the two pieces of DCI detected in cells #1 and #2. For example, Equation 1 described above may be used for the determination of the PUCCH resource.

Generally, in a plurality of pieces of DCI detected in different cells of the same slot, it can be assumed that the cell (cell #1 in FIG. 3) of the first cell index (in other words, the smallest cell index) in the ascending order is a stable connection cell with higher communication quality such as a primary cell (PCell) or a primary secondary cell (PSCell), and the like. Therefore, it can be expected that the smaller the index value of the cell, the smaller the error rate of the PDCCH.

As shown in FIG. 4, by determining the PUCCH resource by using the CCE index for the DCI detected in cell #1 of the smallest cell index, it is possible to reduce the probability of falsely determining the PUCCH resource. As a result, it is possible to reduce the probability of collision of the PUCCH.

Note that, in FIG. 4, the base station may arbitrarily configure the PRIs in the pieces of DCI to transmit in different cells in the same slot. Therefore, the base station can configure PRIs in a plurality of pieces of DCI to transmit in different cells in the same slot to the same value. On the other hand, the base station may not arbitrarily configure CCEs to allocate the plurality of pieces of DCI. For example, this is because a resource (for example, CCE) in collision with DCI of another user terminal cannot be allocated with another DCI.

In FIG. 4, by configuring the PRIs in the two respective pieces of DCI in cell #1 and cell #2 to the same value, in a case of failing to detect the DCI of cell #2, the user terminal can appropriately determine the PUCCH resource, based on the PRI and the CCE index in the DCI detected in cell #1.

<<In Case of Failing to Detect DCI>>

In the first CCE index derivation and second CCE index derivation, the user terminal may recognize a detection failure of DCI, based on the value of a certain field (for example, downlink assignment index (DAI) field) in each DCI.

The bit values of the DAI field may indicate a value (also referred to as count value, counter DAI, and the like) to count a plurality of pieces of DCI indicating the same HARQ-ACK timing.

In this case, the user terminal may recognize a detection failure of at least one or some pieces of the DCI, based on counter DAIs in the plurality of pieces of DCI and the number of pieces of DCI in a cell direction configured in advance (semi-static codebook). For example, in a case that the number of pieces of DCI in a cell direction in the same slot is configured to 2, the user terminal may recognize a detection failure of one or some pieces of DCI, based on omission of a counter DAI in two pieces of DCI.

Alternatively, a part of bit values (for example, two most significant bits (MSBs)) of the DAI field may indicate the counter DAI, and the rest of the bit values (for example, two least significant bits (LSBs)) of the DAI field may indicate the total number of the plurality of pieces of DCI (also referred to as a total value, total DAI, and the like).

In this case, the user terminal may recognize a detection failure of at least one or some pieces of the DCI, based on counter DAIs and the total DAI in the plurality of pieces of DCI (dynamic codebook). For example, in FIGS. 3 and 4, the counter DAI and the total DAI in each of the two pieces of DCI detected in cells #1 and #2 in the same slot are shown.

As shown in FIGS. 3 and 4, as for a counter DAI, DCI is counted in the ascending order of the cell index in the frequency direction. Therefore, as for the DCI detected in cell #1 of FIGS. 3 and 4, (counter DAI, total DAI)=(1, 2). As for the DCI detected in cell #2 of FIGS. 3 and 4, (counter DAI, total DAI)=(2, 2).

In FIGS. 3 and 4, in a case of detecting only DCI of (counter DAI, total DAI)=(1, 2), the user terminal can recognize a detection failure of DCI of (counter DAI, total DAI)=(2, 2). Similarly, in a case of detecting only DCI of (counter DAI, total DAI)=(2, 2), the user terminal can recognize a detection failure of DCI of (counter DAI, total DAI)=(1, 2).

In FIGS. 3 and 4, in a case of recognizing a detection failure of DCI to derive a CCE index (for example, DCI transmitted in cell #2 in FIG. 3, DCI transmitted in cell #1 in FIG. 4), the user terminal may determine the PUCCH resource, for example, based on one of (1) to (3) as follow.

(1) The user terminal may assume that the CCE index used for the determination of the PUCCH resource is a fixed value (for example, zero). For example, Equation 1 described above may be used for the determination of the PUCCH resource.

(2) The user terminal may determine the PUCCH resource, based on the ARI without being based on the CCE index. In this case, in a case of using Equation 1 described above, the user terminal may assume that the CCE index is zero, or may use an equation (for example, an equation excluding the parameter $n_{CCE,p}$ for the CCCE index) different from Equation 1 described above.

(3) The user terminal may determine the PUCCH resource, based on a CCE index determined according to a certain rule in one or more pieces of DCI which are actually detected. The CCE index which is determined according to the certain rule may be, for example, a CCE index of the first CCE in which the DCI of the first cell index in the ascending order or the descending order is allocated among the pieces of DCI which are actually detected.

In FIG. 3, the PRI and the CCE index are derived by the same DCI. In this case, in a case of failing to detect the DCI to derive the CCE index, the PRI may not be derived either. In FIG. 4, it is also assumed to fail to detect the DCI to derive the PRI even if the DCI to derive the CCE index can be detected.

Thus, the base station may configure PRIs in pieces of DCI of different cells in the same slot to the same value as described above. Thereby, the user terminal may determine the PUCCH resource, based on the PRI of another DCI that is actually detected. The PRI may be a PRI in the DCI of the first cell index in the ascending order or the descending order among pieces of DCI that are actually detected. Alternatively, in a case of recognizing a detection failure of the DCI to derive the PRI, the user terminal may assume the PRI to be a fixed value (for example, zero) and determine the PUCCH resource.

<<Monitoring Occasion>>

In a case that a plurality of pieces of DCI indicating the same HARQ-ACK timing are detected in different cells, the user terminal may determine the CCE index to use for the determination of the PUCCH resource, based on a monitoring occasion (also referred to as a period for the monitoring, monitoring period, and the like) of the DCI (PDCCH) in addition to the cell index.

For example, the user terminal may determine the CCE index, based on the DCI detected in the monitoring occasion of the first monitoring occasion index in the ascending order or the descending order among indexes of monitoring occasions (monitoring occasion indexes) in a case that one or more monitoring occasions are provided in a cell (for example, cell of the first cell index in the descending order or the ascending order) determined as described above.

<Case that a Plurality of Pieces of DCI are Detected in Time Domain>

In a case that a plurality of pieces of DCI indicating the same HARQ-ACK timing (for example, the same slot) are detected in different time bands (for example, a plurality of slots, symbols, and the like), the user terminal may determine the CCE index to use for the determination of the PUCCH resource, based on the timing when the plurality of pieces of DCI are detected.

For example, the CCE index may be derived by the last DCI among a plurality of pieces of DCI including the HARQ-ACK timing field value indicating the same slot for the PUCCH transmission. Particularly, the CCE index may be a CCE index of a certain CCE (the first CCE) in which the last DCI is allocated.

Figure 5:
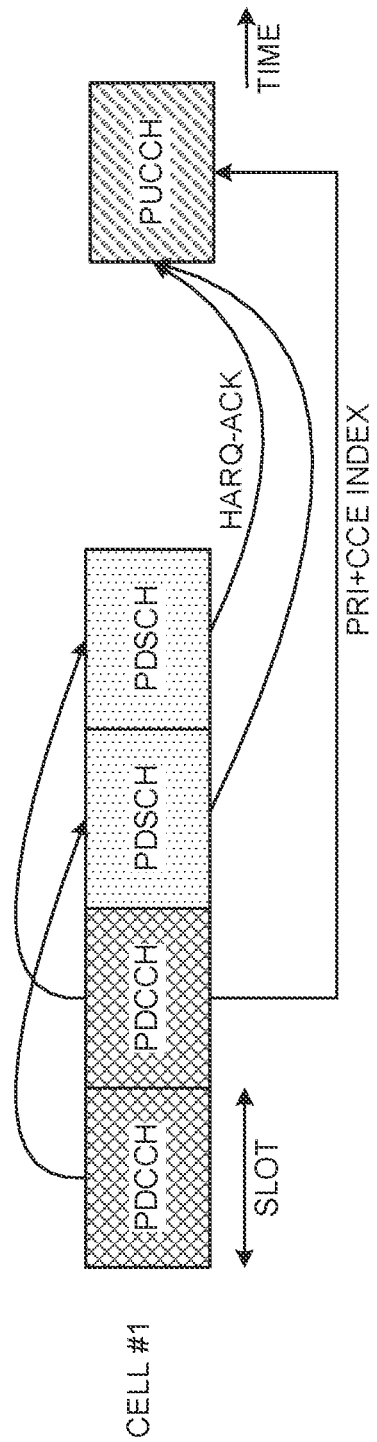
FIG. 5 is a diagram to show an example of determination of a PUCCH resource in a case that a plurality of pieces of DCI are detected in the time domain according to the first aspect.

FIG. 5 is a diagram to show an example of determination of a PUCCH resource in a case that a plurality of pieces of DCI are detected in the time domain according to the first aspect. For example, in FIG. 5, two pieces of DCI including a HARQ-ACK timing field value indicating the same slot for the PUCCH transmission are detected in different slots in the same cell. In the following, differences from FIGS. 3 and 4 will be mainly described.

As shown in FIG. 5, the user terminal may determine the PUCCH resource, based on the PRI in the last DCI and the CCE index of the first CCE in which the DCI is allocated among the two pieces of DCI detected in different slots. For example, Equation 1 described above may be used for the determination of the PUCCH resource.

For example, for the first PUCCH resource set in which the size $R_{PUCCH}$ of the higher layer parameter (resourceList) is greater than 8, in a case that the user terminal transmits HAR-QACK by the PUCCH transmission corresponding to the detection of the last DCI among pieces of DCI having a HARQ-ACK timing field value indicating the same slot for the PUCCH transmission, the user terminal may determine the index $r_{PUCCH}$ ($0 \leq r_{PUCCH} \leq R_{PUCCH}-1$) of the PUCCH resource, based on at least one of the following parameters:

the number of CCEs ($N_{CCE, p}$) in the CORESET p of the PDCCH reception of certain DCI among the pieces of DCI having the HARQ-ACK timing field value indicating the same slot for the PUCCH transmission;

the CCE index ($n_{CCE, p}$) of the first CCE of the PDCCH reception of the last DCI among the pieces of DCI having the HARQ-ACK timing field value indicating the same slot for the PUCCH transmission; and the PRI ($\Delta_{PRI}$) in the last DCI among the pieces of DCI having the HARQ-ACK timing field value indicating the same slot for the PUCCH transmission.

<Case that a Plurality of Pieces of DCI are Detected in Both Time Domain and Frequency Domain>

As above, in the first aspect, a case that a plurality of pieces of DCI are detected in the time domain and a case that a plurality of pieces of DCI are detected in the frequency domain are described separately, but no such limitation is intended. Even in a case that a plurality of pieces of DCI are detected in the time domain and the frequency domain, the present invention is applicable by combining the contents described above.

For example, in a case that a plurality of pieces of DCI indicating the same HARQ-ACK timing (for example, the same slot) are detected in a plurality of cells in each of a plurality of slots, the user terminal may derive the CCE index used for the determination of the PUCCH resource, based on the DCI detected in the cell of the descending order or the first cell index among a plurality of cell indexes of the last slot.

According to the first aspect described above, in a case that a plurality of pieces of DCI indicating the same HARQ-ACK timing are detected in at least one of the time domain and the frequency domain, the CCE index to use for the determination of the PUCCH resource can be appropriately derived. As a result, the PUCCH resource to use for the transmission of HARQ-ACK of the PDSCH scheduled by each of the plurality of pieces of DCI can be appropriately determined.

(Second Aspect)

In the second aspect, derivation of the number of CCEs used for the determination of the PUCCH resource will be described. It is assumed that the user terminal determines the PUCCH resource, based on the number of CCEs in the CORESET in which certain DCI is allocated as exemplified in Equation (1) described above.

Note that, in the present specification, the number of CCEs in the CORESET in which certain DCI is allocated may be expressed in other words as the number of CCEs in a search space (or a set of one or more search spaces (search space set)) in which certain DCI is allocated, and the like.

In the second aspect, in a case that a plurality of pieces of DCI indicating the same HARQ-ACK timing are detected in at least one of the time domain and the frequency domain, the user terminal may derive the number of CCEs in the CORESET by using the DCI to derive the CCE index or the PRI, or may derive the number of CCEs in the CORESET, based on an original rule.

<Case of being Based on CCE Index>

In the second aspect, the user terminal may determine the PUCCH resource, based on the number of CCEs in the CORESET in which the DCI used for the derivation of the CCE index ($n_{CCE, p}$) is allocated.

For example, in a case as shown in FIG. 3, the user terminal derives the CCE index to use for the determination of the PUCCH resource, based on the DCI detected in first cell #2 in the descending order of the cell index. Therefore, the user terminal may determine the PUCCH resource, based on the number of CCEs in the CORESET in which the DCI detected in cell #2 is allocated. In this case, all of the number of CCEs, the PRI, and the CCE index used for the determination of the PUCCH resource may be derived based on the same DCI (the DCI detected in cell #2).

On the other hand, in a case as shown in FIG. 4, the user terminal derives the CCE index to use for the determination of the PUCCH resource, based on the DCI detected in first cell #1 in the ascending order of the cell index. Therefore, the user terminal may determine the PUCCH resource, based on the number of CCEs in the CORESET in which the DCI detected in cell #1 is allocated. In this case, the number of CCEs and the CCE index used for the determination of the PUCCH resource are derived based on the same DCI (the DCI detected in cell #2), and the PRI may be derived based on another DCI (the DCI detected in cell #1).

In a case as shown in FIG. 5, the user terminal derives the CCE index to use for the determination of the PUCCH resource, based on the last DCI. Therefore, the user terminal may determine the PUCCH resource, based on the number of CCEs in the CORESET in which the last DCI is allocated. In this case, all of the number of CCEs, the PRI, and the CCE index used for the determination of the PUCCH resource may be derived based on the same DCI (the DCI detected in the last slot).

<Case of being Based on PRI>

Alternatively, in the second aspect, the user terminal may determine the PUCCH resource, based on the number of CCEs in the CORESET in which the DCI used for the derivation of the PRI.

For example, in a case as shown in FIGS. 3 and 4, the user terminal derives the PRI to use for the determination of the PUCCH resource, based on the DCI detected in first cell #2 in the descending order of the cell index. Therefore, the user terminal may determine the PUCCH resource, based on the number of CCEs in the COESET in which the DCI detected in cell #2 is allocated.

In a case shown in FIG. 5, the user terminal derives the PRI to use for the determination of the PUCCH resource, based on the last DCI. Therefore, the user terminal may determine the PUCCH resource, based on the number of CCEs in the CORESET in which the last DCI is allocated.

<Case of being Based on Rule Independent of at Least One of CCE Index and PRI>

Alternatively, in the second aspect, the user terminal may derive the number of CCEs, based on a rule independent of at least one of the CCE index and the PRI, and may determine the PUCCH resource, based on the number of CCEs derived.

For example, as shown in FIGS. 3 and 4, in a case that a plurality of pieces of DCI indicating the same HARQ-ACK timing are detected in different cells, the user terminal may determine the PUCCH resource, based on the CCE index derived by the DCI detected in the cell of the first cell index in the descending order or the ascending order.

As shown in FIG. 5, in a case that a plurality of pieces of DCI indicating the same HARQ-ACK timing are detected in different slots, the user terminal may determine the PUCCH resource, based on the CCE index derived by the DCI detected in the first or the last slot.

In a case that a plurality of pieces of DCI indicating the same HARQ-ACK timing are detected in different cells and different slots, the user terminal may determine the PUCCH resource, based on the CCE index derived by the DCI detected in the cell of the first cell index in the descending order or the ascending order among pieces of DCI of a plurality of cells detected in the first or the last slot.

According to the second aspect described above, in a case that a plurality of pieces of DCI indicating the same HARQ-ACK timing are detected in at least one of the time domain and the frequency domain, the number of CCEs in the CORESET to use for the determination of the PUCCH resource can be appropriately derived. As a result, the PUCCH resource to use for the transmission of HARQ-ACK of the PDSCH scheduled by each of the plurality of pieces of DCI can be appropriately determined.

(Radio Communication System)

Hereinafter, a structure of a radio communication system according to the present embodiment will be described. In this radio communication system, communication is performed by using at least one combination of the aspects described above in the present disclosure.

Figure 6:
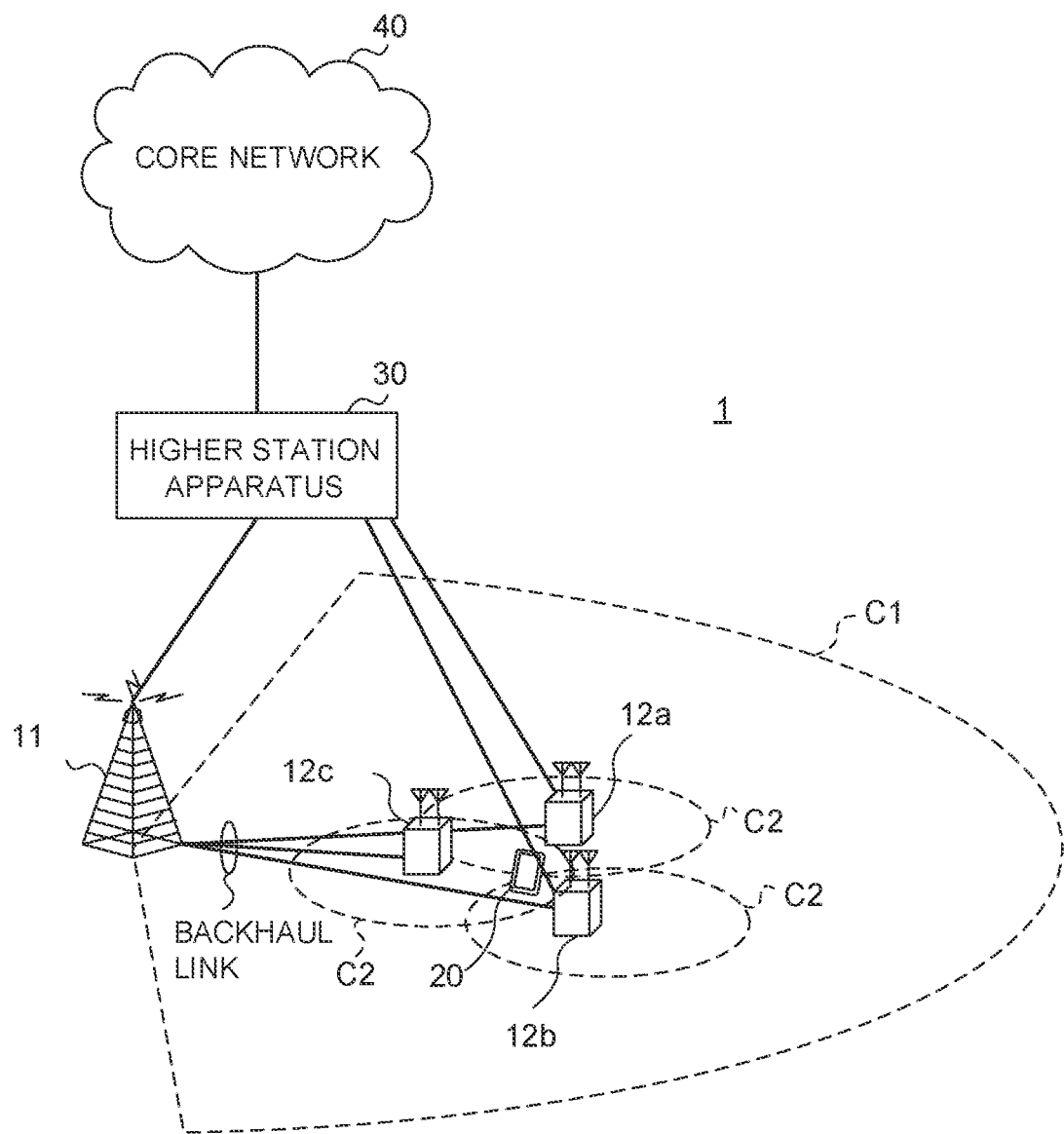
FIG. 6 is a diagram to show an example of a schematic structure of a radio communication system according to the present embodiment.

FIG. 6 is a diagram to show an example of a schematic structure of the radio communication system according to the present embodiment. A radio communication system 1 can adopt carrier aggregation (CA) and/or dual connectivity (DC) to group a plurality of fundamental frequency blocks (component carriers) into one, where the system bandwidth in an LTE system (for example, 20 MHz) constitutes one unit.

Note that the radio communication system 1 may be referred to as "LTE (Long Term Evolution)," "LTE-A (LTE-Advanced)," "LTE-B (LTE-Beyond)," "SUPER 3G," "IMT-Advanced," "4G (4th generation mobile communication system)," "5G (5th generation mobile communication system)," "NR (New Radio)," "FRA (Future Radio Access)," "New-RAT (Radio Access Technology)," and so on, or may be referred to as a system implementing these.

The radio communication system 1 includes a radio base station 11 that forms a macro cell C1 of a relatively wide coverage, and radio base stations 12 (12*a* to 12*c*) that form small cells C2, which are placed within the macro cell C1 and which are narrower than the macro cell C1. Also, user terminals 20 are placed in the macro cell C1 and in each small cell C2. The arrangement, the number, and the like of each cell and user terminal 20 are by no means limited to the aspect shown in the diagram.

The user terminals 20 can connect with both the radio base station 11 and the radio base stations 12. It is assumed that the user terminals 20 use the macro cell C1 and the small cells C2 at the same time by means of CA or DC. The user terminals 20 can execute CA or DC by using a plurality of cells (CCs).

Between the user terminals 20 and the radio base station 11, communication can be carried out by using a carrier of a relatively low frequency band (for example, 2 GHz) and a narrow bandwidth (referred to as, for example, an "existing carrier," a "legacy carrier" and so on). Meanwhile, between the user terminals 20 and the radio base stations 12, a carrier of a relatively high frequency band (for example, 3.5 GHz, 5 GHz, and so on) and a wide bandwidth may be used, or the same carrier as that used between the user terminals 20 and the radio base station 11 may be used. Note that the structure of the frequency band for use in each radio base station is by no means limited to these.

The user terminals 20 can perform communication by using time division duplex (TDD) and/or frequency division duplex (FDD) in each cell. Furthermore, in each cell (carrier), a single numerology may be employed, or a plurality of different numerologies may be employed.

Numerologies may be communication parameters applied to transmission and/or reception of a certain signal and/or channel, and for example, may indicate at least one of a subcarrier spacing, a bandwidth, a symbol length, a cyclic prefix length, a subframe length, a TTI length, the number of symbols per TTI, a radio frame structure, a particular filter processing performed by a transceiver in a frequency domain, a particular windowing processing performed by a transceiver in a time domain, and so on. For example, if certain physical channels use different subcarrier spacings of the OFDM symbols constituted and/or different numbers of the OFDM symbols, it may be referred to as that the numerologies are different.

A wired connection (for example, means in compliance with the CPRI (Common Public Radio Interface) such as an optical fiber, an X2 interface and so on) or a wireless connection may be established between the radio base station 11 and the radio base stations 12 (or between two radio base stations 12).

The radio base station 11 and the radio base stations 12 are each connected with a higher station apparatus 30, and are connected with a core network 40 via the higher station apparatus 30. Note that the higher station apparatus 30 may be, for example, access gateway apparatus, a radio network controller (RNC), a mobility management entity (MME) and so on, but is by no means limited to these. Also, each radio base station 12 may be connected with the higher station apparatus 30 via the radio base station 11.

Note that the radio base station 11 is a radio base station having a relatively wide coverage, and may be referred to as a "macro base station," a "central node," an "eNB (eNodeB)," a "transmitting/receiving point" and so on. The radio base stations 12 are radio base stations having local coverages, and may be referred to as "small base stations," "micro base stations," "pico base stations," "femto base stations," "HeNBs (Home eNodeBs)," "RRHs (Remote Radio Heads)," "transmitting/receiving points" and so on. Hereinafter, the radio base stations 11 and 12 will be collectively referred to as "radio base stations 10," unless specified otherwise.

Each of the user terminals 20 is a terminal that supports various communication schemes such as LTE and LTE-A, and may include not only mobile communication terminals (mobile stations) but stationary communication terminals (fixed stations).

In the radio communication system 1, as radio access schemes, orthogonal frequency division multiple access (OFDMA) is applied to the downlink, and single carrier frequency division multiple access (SC-FDMA) and/or OFDMA is applied to the uplink.

OFDMA is a multi-carrier communication scheme to perform communication by dividing a frequency band into a plurality of narrow frequency bands (subcarriers) and mapping data to each subcarrier. SC-FDMA is a single carrier communication scheme to mitigate interference between terminals by dividing the system bandwidth into bands formed with one or continuous resource blocks per terminal, and allowing a plurality of terminals to use mutually different bands. Note that the uplink and downlink radio access schemes are by no means limited to the combinations of these, and other radio access schemes may be used.

In the radio communication system 1, a downlink shared channel (PDSCH (Physical Downlink Shared Channel), which is used by each user terminal 20 on a shared basis, a broadcast channel (PBCH (Physical Broadcast Channel)), downlink L1/L2 control channels and so on, are used as downlink channels. User data, higher layer control information, SIBs (System Information Blocks) and so on are communicated on the PDSCH. The MIBs (Master Information Blocks) are communicated on the PBCH.

The downlink L1/L2 control channels include a PDCCH (Physical Downlink Control Channel), an EPDCCH (Enhanced Physical Downlink Control Channel), a PCFICH (Physical Control Format Indicator Channel), a PHICH (Physical Hybrid-ARQ Indicator Channel) and so on. Downlink control information (DCI), including PDSCH and/or PUSCH scheduling information, and so on are communicated on the PDCCH.

Note that, the DCI scheduling DL data reception may be referred to as "DL assignment," and the DCI scheduling UL data transmission may be referred to as "UL grant."

The number of OFDM symbols to use for the PDCCH may be communicated on the PCFICH. Transmission confirmation information (for example, also referred to as "retransmission control information," "HARQ-ACK," "ACK/NACK," and so on) of HARQ (Hybrid Automatic Repeat reQuest) to a PUSCH may be transmitted on the PHICH. The EPDCCH is frequency-division multiplexed with the PDSCH (downlink shared data channel) and used to communicate DCI and so on, like the PDCCH.

In the radio communication system 1, an uplink shared channel (PUSCH (Physical Uplink Shared Channel)), which is used by each user terminal 20 on a shared basis, an uplink control channel (PUCCH (Physical Uplink Control Channel)), a random access channel (PRACH (Physical Random Access Channel)) and so on are used as uplink channels. User data, higher layer control information and so on are communicated on the PUSCH. In addition, radio quality information (CQI (Channel Quality Indicator)) of the downlink, transmission confirmation information, scheduling request (SR), and so on are transmitted on the PUCCH. By means of the PRACH, random access preambles for establishing connections with cells are communicated.

In the radio communication system 1, a cell-specific reference signal (CRS), a channel state information-reference signal (CSI-RS), a demodulation reference signal (DMRS), a positioning reference signal (PRS), and so on are transmitted as downlink reference signals. In the radio communication system 1, a measurement reference signal (SRS (Sounding Reference Signal)), a demodulation reference signal (DMRS), and so on are transmitted as uplink reference signals. Note that DMRS may be referred to as a "user terminal specific reference signal (UE-specific Reference Signal)." Transmitted reference signals are by no means limited to these.

<Radio Base Station>

Figure 7:
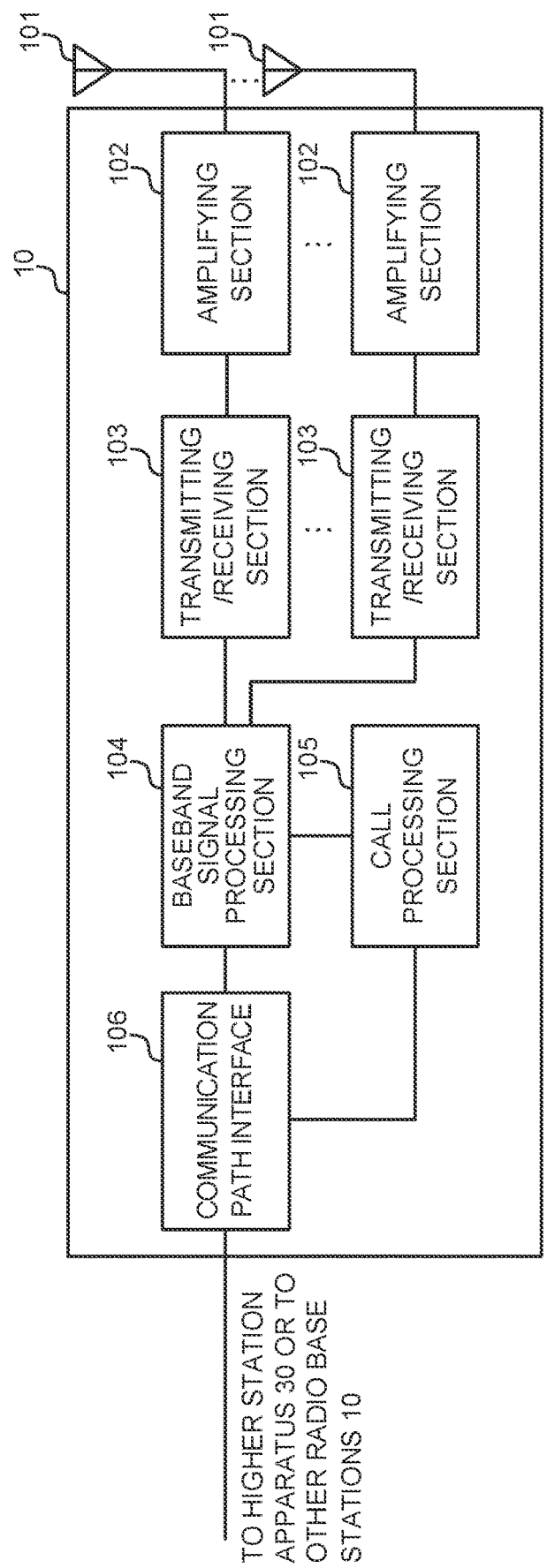
FIG. 7 is a diagram to show an example of an overall structure of a radio base station according to the present embodiment.

FIG. 7 is a diagram to show an example of an overall structure of the radio base station according to the present embodiment. A radio base station 10 includes a plurality of transmitting/receiving antennas 101, amplifying sections 102, transmitting/receiving sections 103, a baseband signal processing section 104, a call processing section 105 and a communication path interface 106. Note that the radio base station 10 may be configured to include one or more transmitting/receiving antennas 101, one or more amplifying sections 102 and one or more transmitting/receiving sections 103.

User data to be transmitted from the radio base station 10 to the user terminal 20 by the downlink is input from the higher station apparatus 30 to the baseband signal processing section 104, via the communication path interface 106.

In the baseband signal processing section 104, the user data is subjected to transmission processes, such as a PDCP (Packet Data Convergence Protocol) layer process, division and coupling of the user data, RLC (Radio Link Control) layer transmission processes such as RLC retransmission control, MAC (Medium Access Control) retransmission control (for example, an HARQ transmission process), scheduling, transport format selection, channel coding, an inverse fast Fourier transform (IFFT) process, and a pre-coding process, and the result is forwarded to each transmitting/receiving section 103. Furthermore, downlink control signals are also subjected to transmission processes such as channel coding and inverse fast Fourier transform, and the result is forwarded to each transmitting/receiving section 103.

The transmitting/receiving sections 103 convert baseband signals that are pre-coded and output from the baseband signal processing section 104 on a per antenna basis, to have radio frequency bands and transmit the result. The radio frequency signals having been subjected to frequency conversion in the transmitting/receiving sections 103 are amplified in the amplifying sections 102, and transmitted from the transmitting/receiving antennas 101. The transmitting/receiving sections 103 can be constituted with transmitters/receivers, transmitting/receiving circuits or transmitting/receiving apparatus that can be described based on general understanding of the technical field to which the present disclosure pertains. Note that each transmitting/receiving section 103 may be structured as a transmitting/receiving section in one entity, or may be constituted with a transmitting section and a receiving section.

Meanwhile, as for uplink signals, radio frequency signals that are received in the transmitting/receiving antennas 101 are amplified in the amplifying sections 102. The transmitting/receiving sections 103 receive the uplink signals amplified in the amplifying sections 102. The transmitting/receiving sections 103 convert the received signals into the baseband signal through frequency conversion and outputs to the baseband signal processing section 104.

In the baseband signal processing section 104, user data that is included in the uplink signals that are input is subjected to a fast Fourier transform (FFT) process, an inverse discrete Fourier transform (IDFT) process, error correction decoding, a MAC retransmission control receiving process, and RLC layer and PDCP layer receiving processes, and forwarded to the higher station apparatus 30 via the communication path interface 106. The call processing section 105 performs call processing (setting up, releasing and so on) for communication channels, manages the state of the radio base station 10, manages the radio resources and so on.

The communication path interface 106 transmits and/or receives signals to and/or from the higher station apparatus 30 via a certain interface. The communication path interface 106 may transmit and/or receive signals (backhaul signaling) with other radio base stations 10 via an inter-base station interface (for example, an optical fiber in compliance with the CPRI (Common Public Radio Interface) and an X2 interface).

Figure 8:
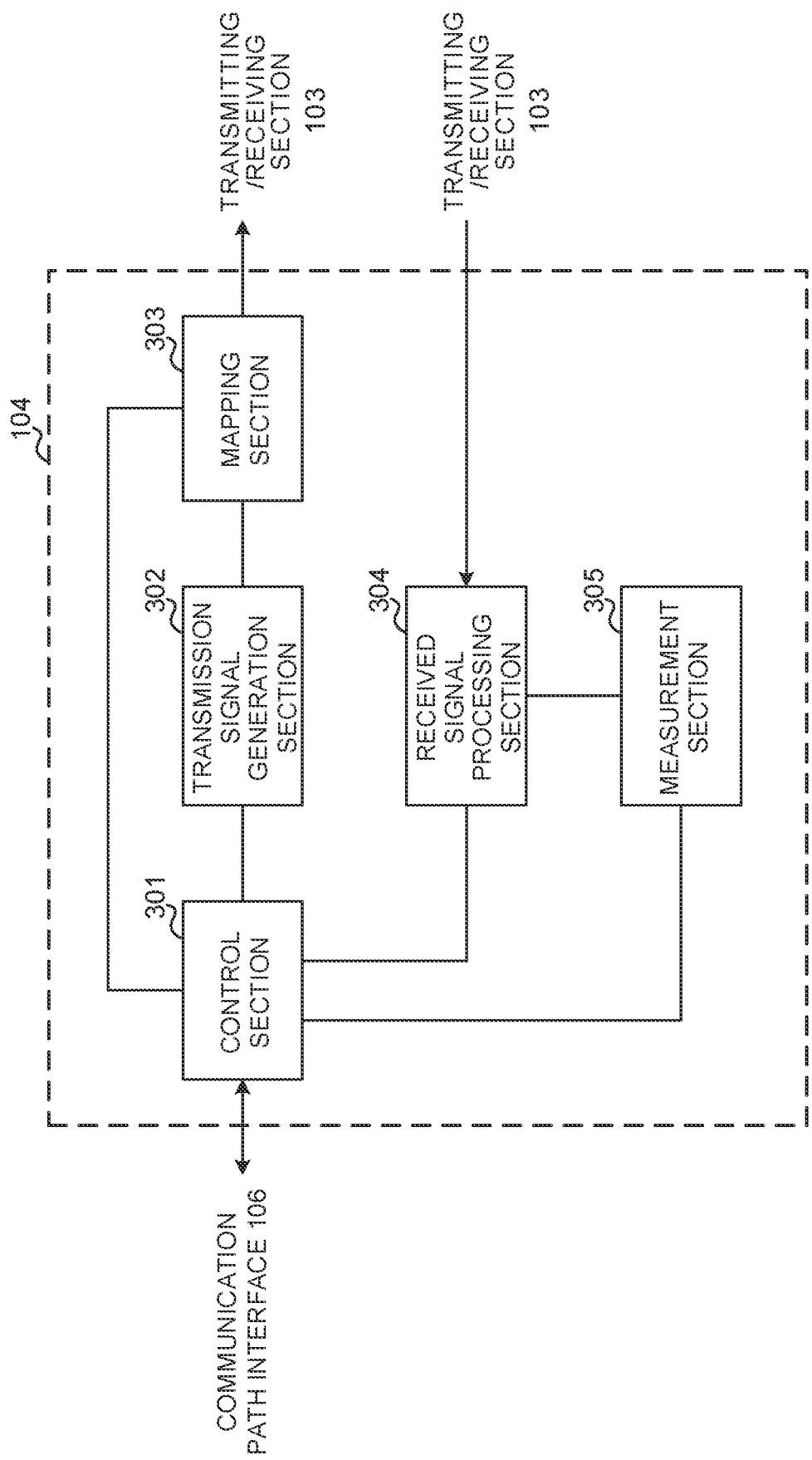
FIG. 8 is a diagram to show an example of a functional structure of the radio base station according to the present embodiment.

FIG. 8 is a diagram to show an example of a functional structure of the radio base station according to the present embodiment. Note that the present example primarily shows functional blocks that pertain to characteristic parts of the present embodiment, and it may be assumed that the radio base station 10 includes other functional blocks that are necessary for radio communication as well.

The baseband signal processing section 104 at least includes a control section (scheduler) 301, a transmission signal generation section 302, a mapping section 303, a received signal processing section 304, and a measurement section 305. Note that these structures may be included in the radio base station 10, and some or all of the structures do not need to be included in the baseband signal processing section 104.

The control section (scheduler) 301 controls the whole of the radio base station 10. The control section 301 can be constituted with a controller, a control circuit or control apparatus that can be described based on general understanding of the technical field to which the present disclosure pertains.

The control section 301, for example, controls the generation of signals in the transmission signal generation section 302, the mapping of signals by the mapping section 303, and so on. The control section 301 controls the signal receiving processes in the received signal processing section 304, the measurements of signals in the measurement section 305, and so on.

The control section 301 controls the scheduling (for example, resource assignment) of system information, a downlink data signal (for example, a signal transmitted on the PDSCH), a downlink control signal (for example, a signal transmitted on the PDCCH and/or the EPDCCH, transmission confirmation information, and so on). Based on the results of determining necessity or not of retransmission control to the uplink data signal, or the like, the control section 301 controls generation of a downlink control signal, a downlink data signal, and so on.

The control section 301 controls the scheduling of a synchronization signal (for example, PSS (Primary Synchronization Signal)/SSS (Secondary Synchronization Signal)), a downlink reference signal (for example, CRS, CSI-RS, DMRS), and so on.

The control section 301 controls the scheduling of an uplink data signal (for example, a signal transmitted on the PUSCH), an uplink control signal (for example, a signal transmitted on the PUCCH and/or the PUSCH, transmission confirmation information, and so on), a random access preamble (for example, a signal transmitted on the PRACH), an uplink reference signal, and so on.

The transmission signal generation section 302 generates downlink signals (downlink control signals, downlink data signals, downlink reference signals and so on) based on commands from the control section 301 and outputs the downlink signals to the mapping section 303. The transmission signal generation section 302 can be constituted with a signal generator, a signal generation circuit or signal generation apparatus that can be described based on general understanding of the technical field to which the present disclosure pertains.

For example, the transmission signal generation section 302 generates DCI, based on commands from the control section 301. For example, the DCI is at least one of a DL assignment to report the assignment information of the downlink data, a UL grant to report the assignment information of uplink data, DCI including SFI, and the like. For a downlink data signal, encoding processing and modulation processing are performed in accordance with a coding rate, modulation scheme, or the like determined based on channel state information (CSI) from each user terminal 20. The downlink data signal may include information configured by higher layer signaling.

The mapping section 303 maps the downlink signals generated in the transmission signal generation section 302 to certain radio resources, based on commands from the control section 301, and outputs these to the transmitting/receiving sections 103. The mapping section 303 can be constituted with a mapper, a mapping circuit or mapping apparatus that can be described based on general understanding of the technical field to which the present disclosure pertains.

The received signal processing section 304 performs receiving processes (for example, demapping, demodulation, decoding and so on) of received signals that are input from the transmitting/receiving sections 103. Here, the received signals are, for example, uplink signals that are transmitted from the user terminals 20 (uplink control signals, uplink data signals, uplink reference signals and so on). The received signal processing section 304 can be constituted with a signal processor, a signal processing circuit or signal processing apparatus that can be described based on general understanding of the technical field to which the present disclosure pertains.

The received signal processing section 304 outputs the decoded information acquired through the receiving processes to the control section 301. For example, if the received signal processing section 304 receives the PUCCH including HARQ-ACK, the received signal processing section 304 outputs the HARQ-ACK to the control section 301. The received signal processing section 304 outputs the received signals and/or the signals after the receiving processes to the measurement section 305.

The measurement section 305 conducts measurements with respect to the received signals. The measurement section 305 can be constituted with a measurer, a measurement circuit or measurement apparatus that can be described based on general understanding of the technical field to which the present disclosure pertains.

For example, the measurement section 305 may perform RRM (Radio Resource Management) measurement, CSI (Channel State Information) measurement, and so on, based on the received signal. The measurement section 305 may measure a received power (for example, RSRP (Reference Signal Received Power)), a received quality (for example, RSRQ (Reference Signal Received Quality), an SINR (Signal to Interference plus Noise Ratio), an SNR (Signal to Noise Ratio)), a signal strength (for example, RSSI (Received Signal Strength Indicator)), channel information (for example, CSI), and so on. The measurement results may be output to the control section 301.

Note that the transmitting/receiving sections 103 may transmit downlink control information (DCI). Particularly, the transmitting/receiving sections 103 may transmit a plurality of pieces of DCI each of which includes a certain field value indicating the same slot for an uplink control channel used for the transmission of the transmission confirmation information to a plurality of downlink shared channels.

The transmitting/receiving sections 103 may receive an uplink control channel (PUCCH). The transmitting/receiving sections 103 may transmit configuration information (for example, PUCCH resource and the like) on the uplink control channel by higher layer signaling.

The control section 301 may control at least one of the determination and the assignment of the resource for the uplink control channel. For example, the control section 301 may control the generation of the DCI including the certain field (PRI field) indicating the identifier of the resource for the uplink control channel.

The control section 301 may control the generation of the DCI including the certain field (HARQ-ACK timing field) indicating the timing of the uplink control channel.

The control section 301 may control the generation of the DCI including the certain field (DAI field) indicating counter DAI (or counter DAI and total DAI).

The control section 301 may control the assignment of the DCI to the CCE. Particularly, the control section 301 may assign the DCI to the CCE of the CCE index used for the determination of the resource for the uplink control channel.

The control section 301 may configure the PRI in the DCI transmitted in a plurality of cells in the same slot to the same value.

<User Terminal>

Figure 9:
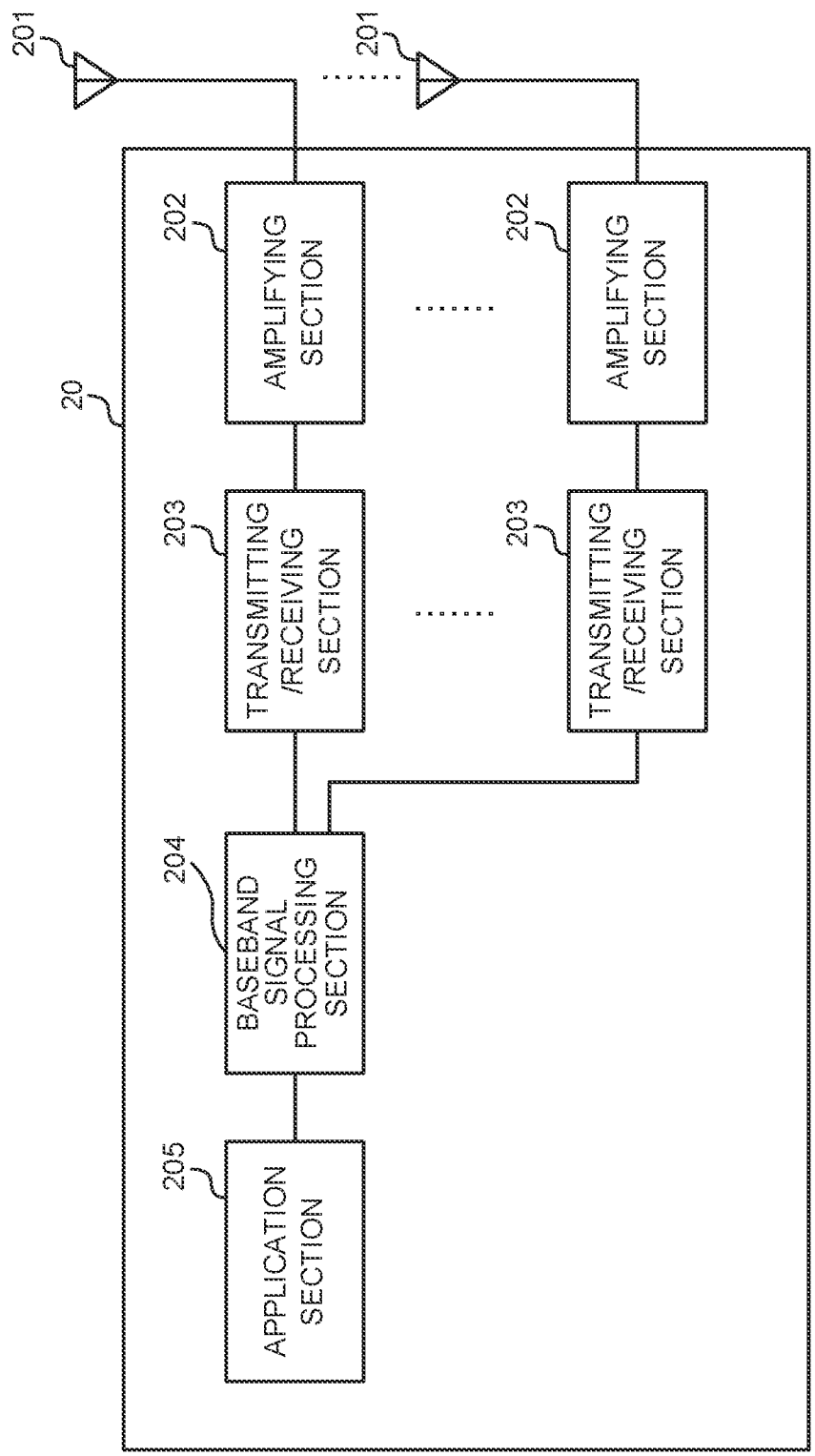
FIG. 9 is a diagram to show an example of an overall structure of a user terminal according to the present embodiment.

FIG. 9 is a diagram to show an example of an overall structure of a user terminal according to the present embodiment. A user terminal 20 includes a plurality of transmitting/receiving antennas 201, amplifying sections 202, transmitting/receiving sections 203, a baseband signal processing section 204 and an application section 205. Note that the user terminal 20 may be configured to include one or more transmitting/receiving antennas 201, one or more amplifying sections 202 and one or more transmitting/receiving sections 203.

Radio frequency signals that are received in the transmitting/receiving antennas 201 are amplified in the amplifying sections 202. The transmitting/receiving sections 203 receive the downlink signals amplified in the amplifying sections 202. The transmitting/receiving sections 203 convert the received signals into baseband signals through frequency conversion, and output the baseband signals to the baseband signal processing section 204. The transmitting/receiving sections 203 can be constituted with transmitters/receivers, transmitting/receiving circuits or transmitting/receiving apparatus that can be described based on general understanding of the technical field to which the present disclosure pertains. Note that each transmitting/receiving section 203 may be structured as a transmitting/receiving section in one entity, or may be constituted with a transmitting section and a receiving section.

The baseband signal processing section 204 performs, on each input baseband signal, an FFT process, error correction decoding, a retransmission control receiving process, and so on. The downlink user data is forwarded to the application section 205. The application section 205 performs processes related to higher layers above the physical layer and the MAC layer, and so on. In the downlink data, broadcast information may be also forwarded to the application section 205.

Meanwhile, the uplink user data is input from the application section 205 to the baseband signal processing section 204. The baseband signal processing section 204 performs a retransmission control transmission process (for example, an HARQ transmission process), channel coding, precoding, a discrete Fourier transform (DFT) process, an IFFT process and so on, and the result is forwarded to the transmitting/receiving section 203.

The transmitting/receiving sections 203 convert the baseband signals output from the baseband signal processing section 204 to have radio frequency band and transmit the result. The radio frequency signals having been subjected to frequency conversion in the transmitting/receiving sections 203 are amplified in the amplifying sections 202, and transmitted from the transmitting/receiving antennas 201.

Figure 10:
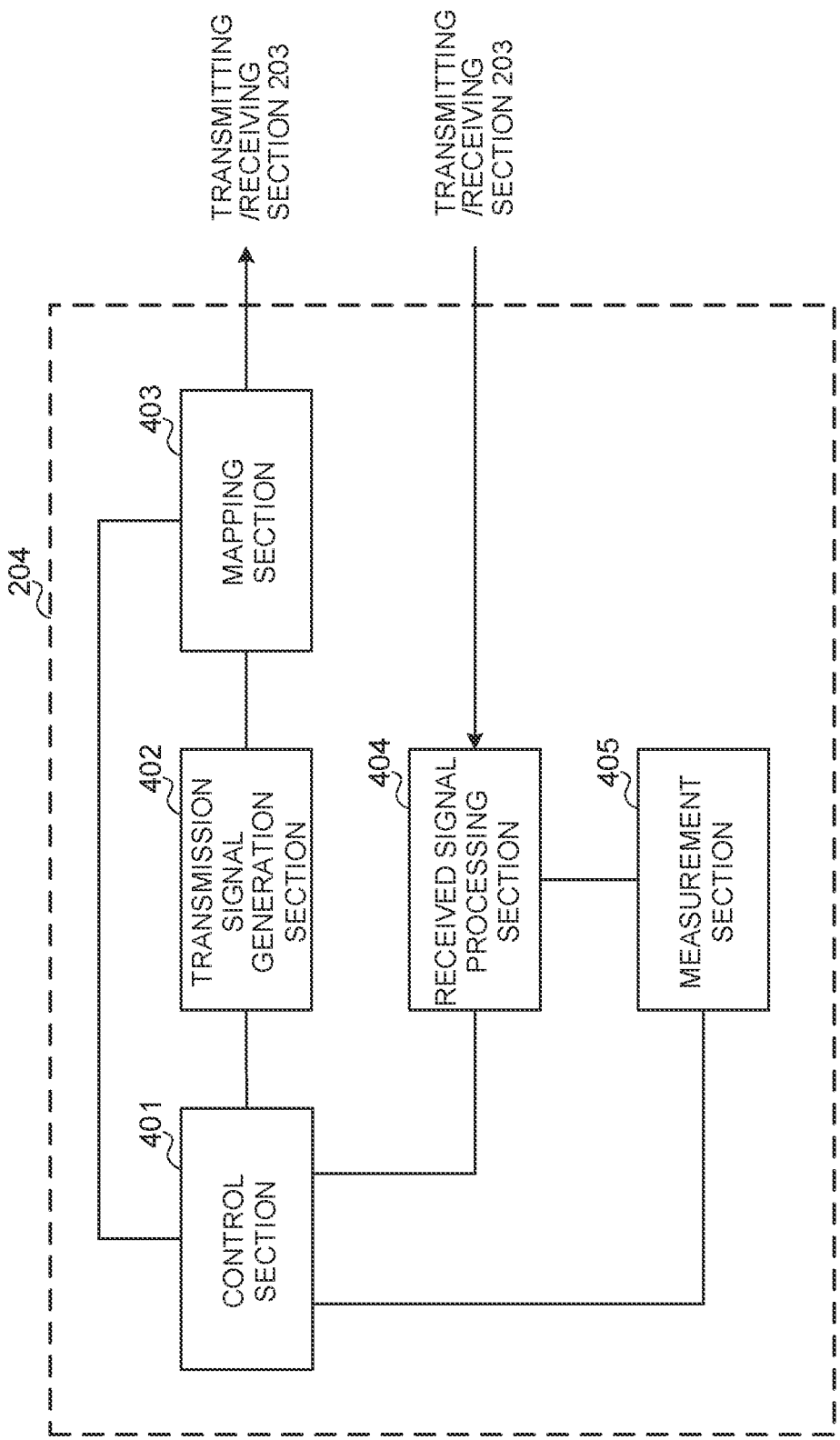
FIG. 10 is a diagram to show an example of a functional structure of the user terminal according to the present embodiment.

FIG. 10 is a diagram to show an example of a functional structure of a user terminal according to the present embodiment. Note that the present example primarily shows functional blocks that pertain to characteristic parts of the present embodiment, and it may be assumed that the user terminal 20 includes other functional blocks that are necessary for radio communication as well.

The baseband signal processing section 204 provided in the user terminal 20 at least includes a control section 401, a transmission signal generation section 402, a mapping section 403, a received signal processing section 404 and a measurement section 405. Note that these structures may be included in the user terminal 20, and some or all of the structures do not need to be included in the baseband signal processing section 204.

The control section 401 controls the whole of the user terminal 20. The control section 401 can be constituted with a controller, a control circuit or control apparatus that can be described based on general understanding of the technical field to which the present disclosure pertains.

The control section 401, for example, controls the generation of signals in the transmission signal generation section 402, the mapping of signals by the mapping section 403, and so on. The control section 401 controls the signal receiving processes in the received signal processing section 404, the measurements of signals in the measurement section 405, and so on.

The control section 401 acquires a downlink control signal and a downlink data signal transmitted from the radio base station 10, from the received signal processing section 404. The control section 401 controls generation of an uplink control signal and/or an uplink data signal, based on the results of determining necessity or not of retransmission control to a downlink control signal and/or a downlink data signal.

If the control section 401 acquires a variety of information reported by the radio base station 10 from the received signal processing section 404, the control section 401 may update parameters to use for control, based on the information.

The transmission signal generation section 402 generates uplink signals (uplink control signals, uplink data signals, uplink reference signals and so on) based on commands from the control section 401, and outputs the uplink signals to the mapping section 403. The transmission signal generation section 402 can be constituted with a signal generator, a signal generation circuit or signal generation apparatus that can be described based on general understanding of the technical field to which the present disclosure pertains.

For example, the transmission signal generation section 402 generates an uplink control signal about transmission confirmation information, the channel state information (CSI), and so on, based on commands from the control section 401. The transmission signal generation section 402 generates uplink data signals, based on commands from the control section 401. For example, when a UL grant is included in a downlink control signal that is reported from the radio base station 10, the control section 401 commands the transmission signal generation section 402 to generate the uplink data signal.

The mapping section 403 maps the uplink signals generated in the transmission signal generation section 402 to radio resources, based on commands from the control section 401, and outputs the result to the transmitting/receiving sections 203. The mapping section 403 can be constituted with a mapper, a mapping circuit or mapping apparatus that can be described based on general understanding of the technical field to which the present disclosure pertains.

The received signal processing section 404 performs receiving processes (for example, demapping, demodulation, decoding and so on) of received signals that are input from the transmitting/receiving sections 203. Here, the received signals are, for example, downlink signals transmitted from the radio base station 10 (downlink control signals, downlink data signals, downlink reference signals and so on). The received signal processing section 404 can be constituted with a signal processor, a signal processing circuit or signal processing apparatus that can be described based on general understanding of the technical field to which the present disclosure pertains. The received signal processing section 404 can constitute the receiving section according to the present disclosure.

The received signal processing section 404 outputs the decoded information acquired through the receiving processes to the control section 401. The received signal processing section 404 outputs, for example, broadcast information, system information, RRC signaling, DCI and so on, to the control section 401. The received signal processing section 404 outputs the received signals and/or the signals after the receiving processes to the measurement section 405.

The measurement section 405 conducts measurements with respect to the received signals. The measurement section 405 can be constituted with a measurer, a measurement circuit or measurement apparatus that can be described based on general understanding of the technical field to which the present disclosure pertains.

For example, the measurement section 405 may perform RRM measurement, CSI measurement, and so on, based on the received signal. The measurement section 405 may measure a received power (for example, RSRP), a received quality (for example, RSRQ, SINR, SNR), a signal strength (for example, RSSI), channel information (for example, CSI), and so on. The measurement results may be output to the control section 401.

Note that the transmitting/receiving sections 203 may receive downlink control information (DCI). Particularly, the transmitting/receiving sections 203 may receive a plurality of pieces of DCI each of which includes a certain field value indicating the same slot for an uplink control channel used for the transmission of the transmission confirmation information to a plurality of downlink shared channels.

The transmitting/receiving sections 203 may transmit an uplink control channel (PUCCH). The transmitting/receiving sections 203 may receive configuration information (for example, PUCCH resource and the like) on the uplink control channel by higher layer signaling.

The control section 401 may control the determination of the resource for the uplink control channel. Particularly, the control section 401 may control the derivation of the index of the control channel element (CCE) used for the determination of the resource for the uplink control channel (first aspect). The control section 401 may control the derivation of the number of control channel elements (CCEs) used for the determination of the resource for the uplink control channel (second aspect).

For example, the control section 401 may determine the resource for the uplink control channel, based on the index of the control channel element (CCE) derived by using the DCI detected in the cell of the first index in the descending order or the ascending order in a plurality of cells, in a case that the plurality of pieces of DCI are detected in the plurality of cells.

The control section 401 may determine the resource for the uplink control channel, based on the index of the control channel element (CCE) derived by using the last DCI in a case that the plurality of pieces of DCI are detected in the plurality of slots.

In a case of recognizing a detection failure of the DCI used for the derivation of the index of the CCE, the control section 401 may determine the resource assuming that the index of the CCE is a fixed value. Alternatively, the control section 401 may determine the resource, based on the identifier (PRI) of the resource. Alternatively, the control section 401 may determine the resource, based on the index of the CCE in which DCI determined based on a certain rule among pieces of DCI which are actually detected is allocated.

The control section 401 may determine the resource for the uplink control channel, based on the number of CCEs in the control resource set in which DCI used for the derivation of the index of the CCE is allocated.

The control section 401 may determine the resource for the uplink control channel, based on the number of CCEs in the control resource set in which DCI derived by using a rule independent of the index of the CCE is allocated.

The control section 401 may control the derivation of the PRI used for the determination of the resource for the uplink control channel. The control section 401 may determine the PUCCH resource, based on at least one of the derived CCE index, the number of CCEs, and the PRI.

<Hardware Structure>

Note that the block diagrams that have been used to describe the above embodiments show blocks in functional units. These functional blocks (components) may be implemented in arbitrary combinations of hardware and/or software. Also, the method for implementing each functional block is not particularly limited. That is, each functional block may be realized by one piece of apparatus that is physically and/or logically aggregated, or may be realized by directly and/or indirectly connecting two or more physically and/or logically separate pieces of apparatus (via wire and/or wireless, for example) and using these plurality of pieces of apparatus.

Figure 11:
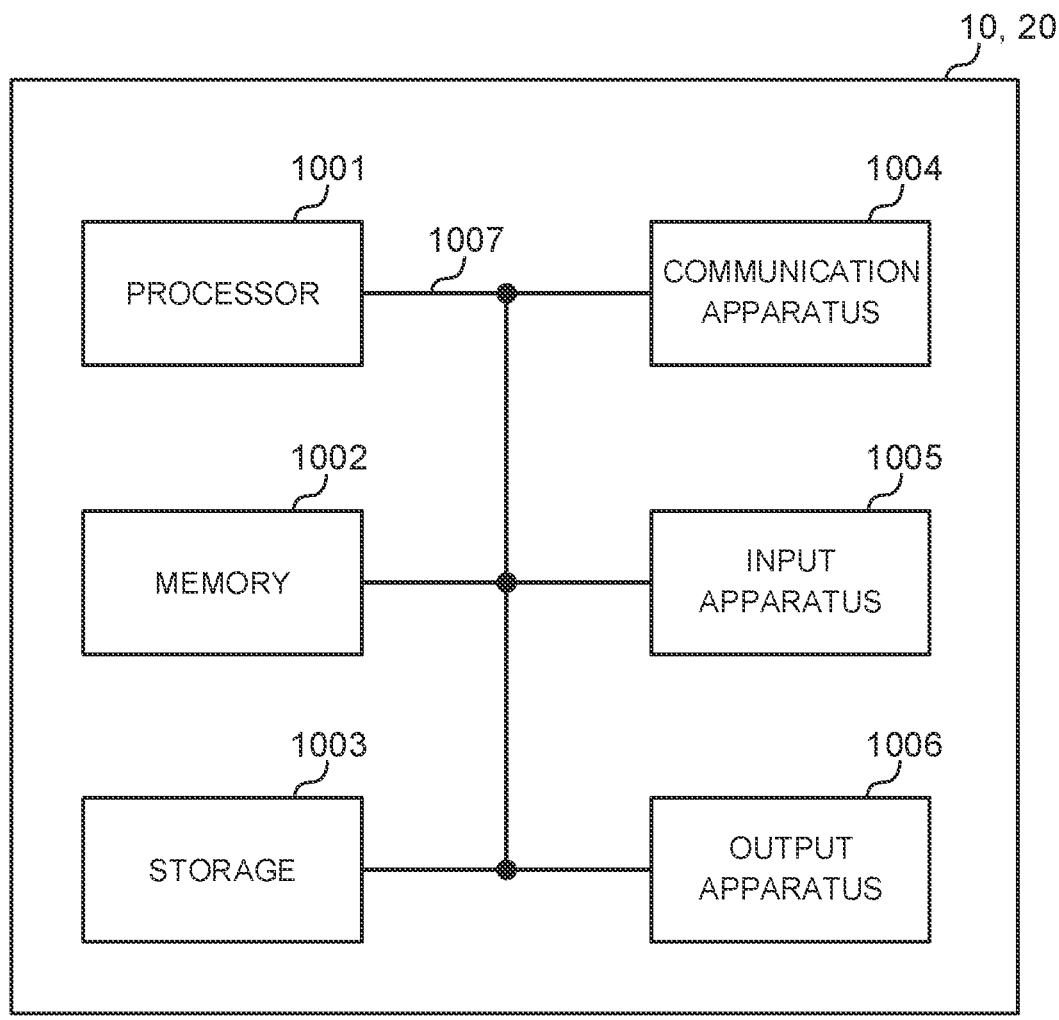
FIG. 11 is a diagram to show an example of a hardware structure of the radio base station and the user terminal according to the present embodiment.

For example, a radio base station, a user terminal, and so on according to the present embodiment may function as a computer that executes the processes of the radio communication method of the present disclosure. FIG. 11 is a diagram to show an example of a hardware structure of the radio base station and the user terminal according to the present embodiment. Physically, the above-described radio base station 10 and user terminals 20 may each be formed as computer apparatus that includes a processor 1001, a memory 1002, a storage 1003, a communication apparatus 1004, an input apparatus 1005, an output apparatus 1006, a bus 1007, and so on.

Note that, in the following description, the word "apparatus" may be interpreted as "circuit," "device," "unit," and so on. The hardware structure of the radio base station 10 and the user terminals 20 may be designed to include one or a plurality of apparatuses shown in the drawings, or may be designed not to include part of pieces of apparatus.

For example, although only one processor 1001 is shown, a plurality of processors may be provided. Furthermore, processes may be implemented with one processor or may be implemented at the same time, in sequence, or in different manners with one or more processors. Note that the processor 1001 may be implemented with one or more chips.

Each function of the radio base station 10 and the user terminals 20 is implemented, for example, by allowing certain software (programs) to be read on hardware such as the processor 1001 and the memory 1002, and by allowing the processor 1001 to perform calculations to control communication via the communication apparatus 1004 and read and/or write data in the memory 1002 and the storage 1003.

The processor 1001 controls the whole computer by, for example, running an operating system. The processor 1001 may be configured with a central processing unit (CPU), which includes interfaces with peripheral apparatus, control apparatus, computing apparatus, a register, and so on. For example, the above-described baseband signal processing section 104 (204), call processing section 105, and so on may be implemented by the processor 1001.

Furthermore, the processor 1001 reads programs (program codes), software modules, data, and so on from the storage 1003 and/or the communication apparatus 1004, into the memory 1002, and executes various processes according to these. As for the programs, programs to allow computers to execute at least part of the operations of the above-described embodiments are used. For example, the control section 401 of each user terminal 20 may be implemented by control programs that are stored in the memory 1002 and that operate on the processor 1001, and other functional blocks may be implemented likewise.

The memory 1002 is a computer-readable recording medium, and may be constituted with, for example, at least one of a ROM (Read Only Memory), an EPROM (Erasable Programmable ROM), an EEPROM (Electrically EPROM), a RAM (Random Access Memory), and other appropriate storage media. The memory 1002 may be referred to as a "register," a "cache," a "main memory (primary storage apparatus)" and so on. The memory 1002 can store executable programs (program codes), software modules, and/or the like for implementing a radio communication method according to the present embodiment.

The storage 1003 is a computer-readable recording medium, and may be constituted with, for example, at least one of a flexible disk, a floppy (registered trademark) disk, a magneto-optical disk (for example, a compact disc (CD-ROM (Compact Disc ROM) and so on), a digital versatile disc, a Blu-ray (registered trademark) disk), a removable disk, a hard disk drive, a smart card, a flash memory device (for example, a card, a stick, and a key drive), a magnetic stripe, a database, a server, and other appropriate storage media. The storage 1003 may be referred to as "secondary storage apparatus."

The communication apparatus 1004 is hardware (transmitting/receiving device) for allowing inter-computer communication via wired and/or wireless networks, and may be referred to as, for example, a "network device," a "network controller," a "network card," a "communication module" and so on. The communication apparatus 1004 may be configured to include a high frequency switch, a duplexer, a filter, a frequency synthesizer, and so on in order to realize, for example, frequency division duplex (FDD) and/or time division duplex (TDD). For example, the above-described transmitting/receiving antennas 101 (201), amplifying sections 102 (202), transmitting/receiving sections 103 (203), communication path interface 106, and so on may be implemented by the communication apparatus 1004.

The input apparatus 1005 is an input device that receives input from the outside (for example, a keyboard, a mouse, a microphone, a switch, a button, a sensor, and so on). The output apparatus 1006 is an output device that allows sending output to the outside (for example, a display, a speaker, an LED (Light Emitting Diode) lamp, and so on). Note that the input apparatus 1005 and the output apparatus 1006 may be provided in an integrated structure (for example, a touch panel).

Furthermore, these types of apparatus, including the processor 1001, the memory 1002, and others, are connected by a bus 1007 for communicating information. The bus 1007 may be formed with a single bus, or may be formed with buses that vary between pieces of apparatus.

Also, the radio base station 10 and the user terminals 20 may be structured to include hardware such as a microprocessor, a digital signal processor (DSP), an ASIC (Application Specific Integrated Circuit), a PLD (Programmable Logic Device), an FPGA (Field Programmable Gate Array), and so on, and part or all of the functional blocks may be implemented by the hardware. For example, the processor 1001 may be implemented with at least one of these pieces of hardware.

(Variations)

Note that the terminology used in this specification and/or the terminology that is needed to understand this specification may be replaced by other terms that convey the same or similar meanings. For example, "channels" and/or "symbols" may be replaced by "signals" ("signaling"). Also, "signals" may be "messages." A reference signal may be abbreviated as an "RS," and may be referred to as a "pilot," a "pilot signal," and so on, depending on which standard applies. Furthermore, a "component carrier (CC)" may be referred to as a "cell," a "frequency carrier," a "carrier frequency" and so on.

Furthermore, a radio frame may be constituted of one or a plurality of periods (frames) in the time domain. Each of one or a plurality of periods (frames) constituting a radio frame may be referred to as a "subframe." Furthermore, a subframe may be constituted of one or a plurality of slots in the time domain. A subframe may have a fixed time length (for example, 1 ms) independent of numerology.

Furthermore, a slot may be constituted of one or a plurality of symbols in the time domain (OFDM (Orthogonal Frequency Division Multiplexing) symbols, SC-FDMA (Single Carrier Frequency Division Multiple Access) symbols, and so on). Furthermore, a slot may be a time unit based on numerology. A slot may include a plurality of mini-slots. Each mini-slot may be constituted of one or a plurality of symbols in the time domain. A mini-slot may be referred to as a "sub-slot."

A radio frame, a subframe, a slot, a mini-slot, and a symbol all express time units in signal communication. A radio frame, a subframe, a slot, a mini-slot, and a symbol may each be called by other applicable terms. For example, one subframe may be referred to as a "transmission time interval (TTI)," a plurality of consecutive subframes may be referred to as a "TTI" or one slot or one mini-slot may be referred to as a "TTI." That is, a subframe and/or a TTI may be a subframe (1 ms) in existing LTE, may be a shorter period than 1 ms (for example, 1 to 13 symbols), or may be a longer period than 1 ms. Note that a unit expressing TTI may be referred to as a "slot," a "mini-slot," and so on instead of a "subframe."

Here, a TTI refers to the minimum time unit of scheduling in radio communication, for example. For example, in LTE systems, a radio base station schedules the allocation of radio resources (such as a frequency bandwidth and transmission power that are available for each user terminal) for the user terminal in TTI units. Note that the definition of TTIs is not limited to this.

TTIs may be transmission time units for channel-encoded data packets (transport blocks), code blocks, and/or codewords, or may be the unit of processing in scheduling, link adaptation, and so on. Note that, when TTIs are given, the time interval (for example, the number of symbols) to which transport blocks, code blocks and/or codewords are actually mapped may be shorter than the TTIs.

Note that, in the case where one slot or one mini-slot is referred to as a TTI, one or more TTIs (that is, one or more slots or one or more mini-slots) may be the minimum time unit of scheduling. Furthermore, the number of slots (the number of mini-slots) constituting the minimum time unit of the scheduling may be controlled.

A TTI having a time length of 1 ms may be referred to as a "normal TTI" (TTI in LTE Rel. 8 to Rel. 12), a "long TTI," a "normal subframe," a "long subframe" and so on. A TTI that is shorter than a normal TTI may be referred to as a "shortened TTI," a "short TTI," a "partial or fractional TTI," a "shortened subframe," a "short subframe," a "mini-slot," a "sub-slot" and so on.

Note that a long TTI (for example, a normal TTI, a subframe, and so on) may be interpreted as a TTI having a time length exceeding 1 ms, and a short TTI (for example, a shortened TTI and so on) may be interpreted as a TTI having a TTI length shorter than the TTI length of a long TTI and equal to or longer than 1 ms.

A resource block (RB) is the unit of resource allocation in the time domain and the frequency domain, and may include one or a plurality of consecutive subcarriers in the frequency domain. Also, an RB may include one or a plurality of symbols in the time domain, and may be one slot, one mini-slot, one subframe, or one TTI in length. One TTI and one subframe each may be constituted of one or a plurality of resource blocks. Note that one or a plurality of RBs may be referred to as a "physical resource block (PRB (Physical RB))," a "sub-carrier group (SCG)," a "resource element group (REG)," a "PRB pair," an "RB pair" and so on.

Furthermore, a resource block may be constituted of one or a plurality of resource elements (REs). For example, one RE may correspond to a radio resource field of one subcarrier and one symbol.

Note that the above-described structures of radio frames, subframes, slots, mini-slots, symbols, and so on are merely examples. For example, structures such as the number of subframes included in a radio frame, the number of slots per subframe or radio frame, the number of mini-slots included in a slot, the numbers of symbols and RBs included in a slot or a mini-slot, the number of subcarriers included in an RB, the number of symbols in a TTI, the symbol length, the cyclic prefix (CP) length, and so on can be variously changed.

Also, the information, parameters, and so on described in this specification may be represented in absolute values or in relative values with respect to certain values, or may be represented in another corresponding information. For example, radio resources may be specified by certain indices.

The names used for parameters and so on in this specification are in no respect limiting. For example, since various channels (PUCCH (Physical Uplink Control Channel), PDCCH (Physical Downlink Control Channel), and so on) and information elements can be identified by any suitable names, the various names assigned to these individual channels and information elements are in no respect limiting.

The information, signals, and/or others described in this specification may be represented by using any of a variety of different technologies. For example, data, instructions, commands, information, signals, bits, symbols, chips, and so on, all of which may be referenced throughout the herein-contained description, may be represented by voltages, currents, electromagnetic waves, magnetic fields or particles, optical fields or photons, or any combination of these.

Also, information, signals, and so on can be output from higher layers to lower layers and/or from lower layers to higher layers. Information, signals, and so on may be input and/or output via a plurality of network nodes.

The information, signals, and so on that are input and/or output may be stored in a specific location (for example, a memory) or may be managed by using a management table. The information, signals, and so on to be input and/or output can be overwritten, updated, or appended. The information, signals, and so on that are output may be deleted. The information, signals, and so on that are input may be transmitted to another apparatus.

Reporting of information is by no means limited to the aspects/embodiments described in this specification, and other methods may be used as well. For example, reporting of information may be implemented by using physical layer signaling (for example, downlink control information (DCI), uplink control information (UCI), higher layer signaling (for example, RRC (Radio Resource Control) signaling, broadcast information (master information block (MIB), system information blocks (SIBs), and so on), MAC (Medium Access Control) signaling and so on), and other signals and/or combinations of these.

Note that physical layer signaling may be referred to as "L1/L2 (Layer 1/Layer 2) control information (L1/L2 control signals)," "L1 control information (L1 control signal)," and so on. Also, RRC signaling may be referred to as an "RRC message," and can be, for example, an RRC connection setup (RRCConnectionSetup) message, an RRC connection reconfiguration (RRCConnectionReconfiguration) message, and so on. Also, MAC signaling may be reported using, for example, MAC control elements (MAC CEs).

Also, reporting of certain information (for example, reporting of "X holds") does not necessarily have to be reported explicitly, and can be reported implicitly (by, for example, not reporting this certain information or reporting another piece of information).

Determinations may be made in values represented by one bit (0 or 1), may be made in Boolean values that represent true or false, or may be made by comparing numerical values (for example, comparison against a certain value).

Software, whether referred to as "software," "firmware," "middleware," "microcode," or "hardware description language," or called by other terms, should be interpreted broadly to mean instructions, instruction sets, code, code segments, program codes, programs, subprograms, software modules, applications, software applications, software packages, routines, subroutines, objects, executable files, execution threads, procedures, functions, and so on.

Also, software, commands, information, and so on may be transmitted and received via communication media. For example, when software is transmitted from a website, a server, or other remote sources by using wired technologies (coaxial cables, optical fiber cables, twisted-pair cables, digital subscriber lines (DSL), and so on) and/or wireless technologies (infrared radiation, microwaves, and so on), these wired technologies and/or wireless technologies are also included in the definition of communication media.

The terms "system" and "network" as used in this specification are used interchangeably.

In the present specification, the terms "base station (BS)," "radio base station," "eNB," "gNB," "cell," "sector," "cell group," "carrier," and "component carrier" may be used interchangeably. A base station may be referred to as a "fixed station," "NodeB," "eNodeB (eNB)," "access point," "transmission point," "receiving point," "femto cell," "small cell" and so on.

A base station can accommodate one or a plurality of (for example, three) cells (also referred to as "sectors"). When a base station accommodates a plurality of cells, the entire coverage area of the base station can be partitioned into multiple smaller areas, and each smaller area can provide communication services through base station subsystems (for example, indoor small base stations (RRHs (Remote Radio Heads))). The term "cell" or "sector" refers to part of or the entire coverage area of a base station and/or a base station subsystem that provides communication services within this coverage.

In the present specification, the terms "mobile station (MS)," "user terminal," "user equipment (UE)," and "terminal" may be used interchangeably.

A mobile station may be referred to as, by a person skilled in the art, a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client," or some other appropriate terms in some cases.

Furthermore, the radio base stations in this specification may be interpreted as user terminals. For example, each aspect/embodiment of the present disclosure may be applied to a configuration in which communication between a radio base station and a user terminal is replaced with communication among a plurality of user terminals (D2D (Device-to-Device)). In this case, the user terminals 20 may have the functions of the radio base stations 10 described above. In addition, wording such as "uplink" and "downlink" may be interpreted as "side." For example, an uplink channel may be interpreted as a side channel.

Likewise, the user terminals in this specification may be interpreted as radio base stations. In this case, the radio base stations 10 may have the functions of the user terminals 20 described above.

Actions which have been described in this specification to be performed by a base station may, in some cases, be performed by upper nodes. In a network including one or a plurality of network nodes with base stations, it is clear that various operations that are performed to communicate with terminals can be performed by base stations, one or more network nodes (for example, MMEs (Mobility Management Entities), S-GW (Serving-Gateways), and so on may be possible, but these are not limiting) other than base stations, or combinations of these.

The aspects/embodiments illustrated in this specification may be used individually or in combinations, which may be switched depending on the mode of implementation. The order of processes, sequences, flowcharts, and so on that have been used to describe the aspects/embodiments herein may be re-ordered as long as inconsistencies do not arise. For example, although various methods have been illustrated in this specification with various components of steps in exemplary orders, the specific orders that are illustrated herein are by no means limiting.

The aspects/embodiments illustrated in this specification may be applied to LTE (Long Term Evolution), LTE-A (LTE-Advanced), LTE-B (LTE-Beyond), SUPER 3G, IMT-Advanced, 4G (4th generation mobile communication system), 5G (5th generation mobile communication system), FRA (Future Radio Access), New-RAT (Radio Access Technology), NR(New Radio), NX (New radio access), FX (Future generation radio access), GSM (registered trademark) (Global System for Mobile communications), CDMA 2000, UMB (Ultra Mobile Broadband), IEEE 802.11 (Wi-Fi (registered trademark)), IEEE 802.16 (WiMAX (registered trademark)), IEEE 802.20, UWB (Ultra-WideBand), Bluetooth (registered trademark), systems that use other adequate radio communication methods and/or next-generation systems that are enhanced based on these.

The phrase "based on" (or "on the basis of") as used in this specification does not mean "based only on" (or "only on the basis of"), unless otherwise specified. In other words, the phrase "based on" (or "on the basis of") means both "based only on" and "based at least on" ("only on the basis of" and "at least on the basis of").

Reference to elements with designations such as "first," "second" and so on as used herein does not generally limit the quantity or order of these elements. These designations may be used herein only for convenience, as a method for distinguishing between two or more elements. Thus, reference to the first and second elements does not imply that only two elements may be employed, or that the first element must precede the second element in some way.

The term "judging (determining)" as used herein may encompass a wide variety of actions. For example, "judging (determining)" may be interpreted to mean making "judgments (determinations)" about calculating, computing, processing, deriving, investigating, looking up (for example, searching a table, a database, or some other data structures), ascertaining, and so on. Furthermore, "judging (determining)" may be interpreted to mean making "judgments (determinations)" about receiving (for example, receiving information), transmitting (for example, transmitting information), input, output, accessing (for example, accessing data in a memory), and so on. In addition, "judging (determining)" as used herein may be interpreted to mean making "judgments (determinations)" about resolving, selecting, choosing, establishing, comparing, and so on. In other words, "judging (determining)" may be interpreted to mean making "judgments (determinations)" about some action.

The terms "connected" and "coupled," or any variation of these terms as used herein mean all direct or indirect connections or coupling between two or more elements, and may include the presence of one or more intermediate elements between two elements that are "connected" or "coupled" to each other. The coupling or connection between the elements may be physical, logical, or a combination thereof. For example, "connection" may be interpreted as "access."

In this specification, when two elements are connected, the two elements may be considered "connected" or "coupled" to each other by using one or more electrical wires, cables and/or printed electrical connections, and, as some non-limiting and non-inclusive examples, by using electromagnetic energy having wavelengths in radio frequency regions, microwave regions, (both visible and invisible) optical regions, or the like.

In this specification, the phrase "A and B are different" may mean that "A and B are different from each other." The terms "separate," "be coupled" and so on may be interpreted similarly.

When terms such as "including," "comprising," and variations of these are used in this specification or in claims, these terms are intended to be inclusive, in a manner similar to the way the term "provide" is used. Furthermore, the term "or" as used in this specification or in claims is intended to be not an exclusive disjunction.

Now, although the invention according to the present disclosure has been described in detail above, it should be obvious to a person skilled in the art that the invention according to the present disclosure is by no means limited to the embodiments described in this specification. The invention according to the present disclosure can be implemented with various corrections and in various modifications, without departing from the spirit and scope of the invention defined by the recitations of claims. Consequently, the description in this specification is provided only for the purpose of explaining examples, and should by no means be construed to limit the invention according to the present disclosure in any way.

What is claimed is:

1. A terminal comprising:
   a receiver that receives, in a first symbol, first downlink control information (DCI) scheduling a first physical downlink shared channel (PDSCH) and receives, in a second symbol later than the first symbol, second DCI scheduling a second PDSCH;
   a processor that, in response to the first DCI indicating a slot for a transmission of first hybrid automatic repeat request acknowledgement (HARQ-ACK) information corresponding to the first PDSCH and the second DCI indicating the slot for a transmission of second HARQ-ACK information corresponding to the second PDSCH, determines, based on a timing when the second DCI is received, a control channel element (CCE) index, and determines, based on the second symbol of the second DCI and the CCE index, a resource for the transmission of the second HARQ-ACK information,
   wherein the processor determines, based on the first symbol and the second symbol, whether the resource is used for the transmission of the first HARQ-ACK information, and
   wherein the processor determines, when the resource is used for the transmission of the first HARQ-ACK information, a HARQ-ACK codebook based on a counter downlink assignment index (DAI) counting the first DCI and the second DCI, and a total DAI; and
   a transmitter that transmits the first HARQ-ACK information and the second HARQ-ACK information using the determined resource.

2. A radio communication method for a terminal, the method comprising:
   receiving, in a first symbol, first downlink control information (DCI) scheduling a first physical downlink shared channel (PDSCH) and receiving, in a second symbol later than the first symbol, second DCI scheduling a second PDSCH;
   in response to the first DCI indicating a slot for a transmission of first hybrid automatic repeat request acknowledgement (HARQ-ACK) information corresponding to the first PDSCH and the second DCI indicating the slot for a transmission of second HARQ-ACK information corresponding to the second PDSCH, determining a control channel element (CCE) index based on a timing when the second DCI is received, and determining a resource for the transmission of the second HARQ-ACK information based on the second symbol of the second DCI and the CCE index,
   wherein a determination whether the resource is used for the transmission of the first HARQ-ACK information is based on the first symbol and the second symbol, and
   wherein the terminal further determines, when the resource is used for the transmission of the first HARQ-ACK information, a HARQ-ACK codebook based on a counter downlink assignment index (DAI) counting the first DCI and the second DCI, and a total DAI; and
   transmitting the first HARQ-ACK information and the second HARQ-ACK information using the determined resource.

3. A system comprising a terminal and a base station, wherein the terminal comprises:
   a receiver that receives, in a first symbol, first downlink control information (DCI) scheduling a first physical downlink shared channel (PDSCH) and receives, in a second symbol later than the first symbol, second DCI scheduling a second PDSCH;
   a processor that, in response to the first DCI indicating a slot for a transmission of first hybrid automatic repeat request acknowledgement (HARQ-ACK) information corresponding to the first PDSCH and the second DCI indicating the slot for a transmission of second HARQ-ACK information corresponding to the second PDSCH, determines, based on a timing when the second DCI is received, a control channel element (CCE) index, and determines, based on the second symbol of the second DCI and the CCE index, a resource for the transmission of the second HARQ-ACK information,
   wherein the processor determines, based on the first symbol and the second symbol, whether the resource is used for the transmission of the first HARQ-ACK information, and
   wherein the processor determines, when the resource is used for the transmission of the first HARQ-ACK information, a HARQ-ACK codebook based on a counter downlink assignment index (DAI) counting the first DCI and the second DCI, and a total DAI; and
   a transmitter that transmits the first HARQ-ACK information and the second HARQ-ACK information using the determined resource, and
   the base station comprises:
   a transmitter that transmits the first DCI and the second DCI; and
   a receiver that receives the first HARQ-ACK information and the second HARQ-ACK information.

* * * * *